United States Patent
Talbot et al.

(10) Patent No.: US 12,524,423 B2
(45) Date of Patent: Jan. 13, 2026

(54) SYSTEMS AND METHODS FOR USING MULTIPLE AGGREGATION LEVELS IN A SINGLE DATA VISUALIZATION

(71) Applicant: TABLEAU SOFTWARE, LLC, Seattle, WA (US)

(72) Inventors: Justin Talbot, Seattle, WA (US); Ross Thomas Bunker, Seattle, WA (US); Robin Stewart, Seattle, WA (US); Bora Beran, Bothell, WA (US)

(73) Assignee: Tableau Software, LLC, Seattle, WA (US)

( * ) Notice: Subject to any disclaimer, the term of this patent is extended or adjusted under 35 U.S.C. 154(b) by 820 days.

(21) Appl. No.: 17/714,070

(22) Filed: Apr. 5, 2022

(65) Prior Publication Data
US 2022/0300525 A1    Sep. 22, 2022

Related U.S. Application Data

(63) Continuation of application No. 14/801,750, filed on Jul. 16, 2015, now Pat. No. 11,294,924.

(51) Int. Cl.
*G06F 16/25* (2019.01)
*G06F 3/0482* (2013.01)
*G06F 3/04842* (2022.01)
*G06F 16/21* (2019.01)

(52) U.S. Cl.
CPC .......... *G06F 16/252* (2019.01); *G06F 3/0482* (2013.01); *G06F 3/04842* (2013.01); *G06F 16/213* (2019.01)

(58) Field of Classification Search
CPC .. G06F 16/252; G06F 3/0482; G06F 3/04842; G06F 16/213; G06F 16/25
USPC ......................................................... 707/805
See application file for complete search history.

(56) References Cited

U.S. PATENT DOCUMENTS

| | | | |
|---|---|---|---|
| 6,212,524 B1* | 4/2001 | Weissman | G06F 16/283 707/769 |
| 8,099,674 B2* | 1/2012 | Mackinlay | G06F 16/248 715/764 |
| 8,640,056 B2* | 1/2014 | Helfman | G06Q 10/10 715/854 |
| 2002/0091678 A1* | 7/2002 | Miller | G06F 16/338 |

(Continued)

*Primary Examiner* — Pierre Vital
*Assistant Examiner* — Andrew N Ho
(74) *Attorney, Agent, or Firm* — Morgan, Lewis & Bockius LLP

(57) ABSTRACT

A computer system displays a graphical user interface that includes a data visualization region, a shelf region, and a schema information region. The computer system receives a first user input to place a first dimension data field from the schema information region into the shelf region. In accordance with the first user input, the computer system determines a visualization level of detail that is based on at least the first dimension data field. The computer system receives a second user input to specify a first aggregation. The first aggregation has a custom level of detail that is distinct from the visualization level of detail. The computer system builds a visual specification that includes the visualization and custom levels of detail. The computer system generates a data visualization corresponding to the visual specification and displays the data visualization in the data visualization region.

18 Claims, 43 Drawing Sheets

(56) References Cited

U.S. PATENT DOCUMENTS

| | | | |
|---|---|---|---|
| 2004/0122844 A1* | 6/2004 | Malloy | G06F 16/283 |
| | | | 707/999.102 |
| 2005/0060300 A1* | 3/2005 | Stolte | G06F 16/211 |
| 2006/0100985 A1* | 5/2006 | Mark | G06Q 10/02 |
| 2006/0206512 A1* | 9/2006 | Hanrahan | G06T 11/206 |
| | | | 707/999.102 |
| 2007/0006139 A1* | 1/2007 | Rubin | G06F 16/00 |
| | | | 717/106 |
| 2007/0061369 A1* | 3/2007 | Folting | G06F 40/103 |
| 2012/0191704 A1* | 7/2012 | Jones | G06F 3/0488 |
| | | | 707/E17.014 |

* cited by examiner

| person_id | county | gender | height (inches) | weight (pounds) |
|---|---|---|---|---|
| 000001 | Marin | F | 65 | 110 |
| 000002 | Sonoma | F | 60 | 145 |
| 000003 | Alameda | M | 70 | 200 |
| 000004 | Orange | F | 66 | 120 |
| 000005 | Santa Cruz | M | 68 | 150 |
| 000006 | Placer | M | 72 | 195 |
| 000007 | Napa | M | 73 | 210 |
| 000008 | San Diego | F | 64 | 108 |
| 000009 | Ventura | M | 64 | 98 |
| 000010 | San Mateo | F | 67 | 125 |
| 000011 | El Dorado | F | 63 | 180 |
| 000012 | Yolo | F | 63 | 124 |
| 000013 | Butte | F | 65 | 115 |
| 000014 | Riverside | M | 67 | 170 |
| 000015 | Shasta | M | 71 | 300 |
| ⋮ | ⋮ | ⋮ | ⋮ | ⋮ |

{fixed [county] : AVG([weight] – {fixed [height],[gender] : AVG([weight])} )}

Figure 8C

{keyword [dimension1],[dimension2]... : aggregate expression}

SYSTEMS AND METHODS FOR USING MULTIPLE AGGREGATION LEVELS IN A SINGLE DATA VISUALIZATION

RELATED APPLICATIONS

This application is a continuation of U.S. patent application Ser. No. 14/801,750, filed on Jul. 16, 2015, entitled "Systems and Methods for Using Multiple Aggregation Levels in a Single Data Visualization," which is incorporated by reference herein in its entirety.

TECHNICAL FIELD

The disclosed implementations relate generally to data visualization and more specifically to systems, methods, and user interfaces for interactive visual analysis of a data set.

BACKGROUND

Data visualization applications enable a user to understand a data set visually, including distribution, trends, outliers, and other factors that are important to making business decisions. Some data elements must be computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations.

SUMMARY

Disclosed implementations address the above deficiencies and other problems associated with interactive analysis of a data set. Disclosed implementations enable users to specify multiple levels of detail using the interactive graphical user interface. The examples below use two levels of detail, but implementations typically allow an unlimited number of levels of detail. In some instances, data calculated according to aggregation at one level of detail is used in a second aggregation at a second level of detail. In some implementations, the data visualization includes a "visualization level of detail," which is used by default for computing aggregations. This is the level of detail that is visible in the final data visualization. Implementations also provide for level of detail expressions, which allow a user to specify a particular level of detail in a specific context.

Some implementations have designated shelf regions that determine characteristics of a desired data visualization. For example, some implementations include a row shelf region and a column shelf region. A user places field names into these shelf regions (e.g., by dragging fields from a schema region), and the field names define the data visualization characteristics. For example, a user may choose a vertical bar chart, with a column for each distinct value of a field placed in the column shelf region. The height of each bar is defined by another field placed into the row shelf region.

In accordance with some implementations, a method of generating and displaying a data visualization is performed at a computer. The computer has a display, one or more processors, and memory storing one or more programs configured for execution by the one or more processors. The process displays a graphical user interface on the display. The graphical user interface includes a schema information region that includes a plurality of fields from a database. The process receives user input in the graphical user interface to specify a first aggregation. The specification of the first aggregation groups the data by a first set of one or more fields of the plurality of fields and identifies a first aggregated output field that is created by the first aggregation. The process also receives user input in the graphical user interface to specify a second aggregation. In some instances, the specification of the second aggregation references the first aggregation. The second aggregation groups the data by a second set of one or more fields. The second set of fields is selected from the plurality of fields and the first aggregated output field. The second set of fields is different from the first set of fields. The process builds a visual specification based on the specifications of the first and second aggregations.

In some implementations, the process includes retrieving tuples of data from the database using one or more database queries generated from the visual specification. In some implementations, the tuples include data calculated based on the second aggregation. In some implementations, the process includes displaying a data visualization corresponding to the visual specification, where the data visualization includes the data calculated based on the second aggregation. In some implementations, the displayed data visualization includes multiple visual marks, with each mark corresponding to a respective tuple retrieved from the database. In some implementations, the graphical user interface includes a data visualization region and the process displays the data visualization in the data visualization region.

In some implementations, the graphical user interface includes a columns shelf and a rows shelf. In some implementations, the process detects user actions to associate one or more first fields of the plurality of fields with the columns shelf and to associate one or more second fields of the plurality of fields with the rows shelf. The process then generates a visual table in the data visualization region in accordance with the user actions. The visual table includes one or more panes, where each pane has an x-axis defined based on data for the one or more first fields associated with the columns shelf, and each pane has a y-axis defined based on data for the one or more second fields associated with the rows shelf. In some implementations, the process receives user input to associate the second aggregation with the columns shelf or the rows shelf.

In some implementations, the process retrieves tuples from the database according to the fields associated with the rows and columns shelves and displays the retrieved tuples as visual marks in the visual table.

In some implementations, operators for the first and second aggregations are selected from: SUM, COUNT, COUNTD (count of distinct elements), MIN, MAX, AVG (mean average), MEDIAN, STDEV (standard deviation), VAR (variance), PERCENTILE (e.g., quartile), ATTR, STDEVP, and VARP. In some implementations, the ATTR( ) aggregation operator returns the value of the expression if it has a single value for all rows, and returns an asterisk otherwise. In some implementations, the STDEVP and VARP aggregation operators return values based on a biased population or the entire population. Some implementations include more or different aggregation operators from those listed here. Some implementations use alternative names for the aggregation operators.

In some implementations, data fields are classified as "dimensions" or "measures" based on how they are being used. A dimension partitions the data set, whereas a measure aggregates the data in each of the partitions. From an SQL mindset, the dimensions are elements in the GROUP BY clause, and the measures are the elements in the SELECT clause. Commonly, discrete categorical data (e.g., a field containing states, regions, or product names) is used for partitioning, whereas continuous numeric data (e.g., profits or sales) is used for aggregating (e.g., computing a sum). However, all types of data fields can be used as either dimensions or measures. For example, a discrete categorical field that contains product names can be used as a measure by applying the aggregate function COUNTD (count distinct). On the other hand, numeric data representing heights of people can be used as a dimension, partitioning people by height or ranges of heights. Some aggregate functions, such as SUM, can only be applied to numeric data. In some implementations, the application assigns to each field a default role (dimension or measure) based on the raw data type of the field, but allows a user to override that role. For example, some applications assign a default role of "dimension" to categorical (string) data fields and a default role of "measure" to numeric fields. In some implementations, date fields are used as dimensions by default because they are commonly used to partition data into date ranges.

The classification as dimensions or measures also applies to calculated expressions. For example, an expression such as YEAR([Purchase Date]) is commonly used as a dimension, partitioning the underlying data into years. As another example, consider a data source that includes a Product Code field (as a character string). If the first three characters of the Product Code encode the product type, then the expression LEFT([Product Code], 3) might be used as a dimension to partition the data into product types.

In some instances, the first aggregated output field is used as a dimension and is included in the second set.

In some implementations, the first aggregated output field is used as a measure and the second aggregation applies one of the aggregation operators to the first aggregated output field. For example, in some instances, the second aggregation computes averages of values for the first aggregated output field.

In some implementations, the process displays a graphical user interface on a computer display. The graphical user interface includes a schema information region and a data visualization region. The schema information region includes multiple field names, where each field name is associated with a data field from the specified databases. The data visualization region includes a plurality of shelf regions that determine the characteristics of the data visualization. Each shelf region is configured to receive user placement of one or more of the field names from the schema information region. The process builds the visual specification according to user selection of one or more of the field names and user placement of each user-selected field name in a respective shelf region in the data visualization region.

In some implementations, the data visualization comprises a dashboard that includes a plurality of distinct component data visualizations. The visual specification comprises a plurality of component visual specifications, and each component data visualization is based on a respective one of the component visual specifications.

In some implementations, the data visualization characteristics defined by the visual specification include mark type and zero or more encodings of the marks. In some implementations, the mark type is one of: bar chart, line chart, scatter plot, text table, or map. In some implementations, the encodings are selected from mark size, mark color, and mark label.

In accordance with some implementations, a system for generating data visualizations includes one or more processors, memory, and one or more programs stored in the memory. The programs are configured for execution by the one or more processors. The programs include instructions for performing any of the methods described above.

In accordance with some implementations, a non-transitory computer readable storage medium stores one or more programs configured for execution by a computer system having one or more processors and memory. The one or more programs include instructions for performing any of the methods described above.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 8A-8D provide another example of building a data visualization that uses multiple levels of detail in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
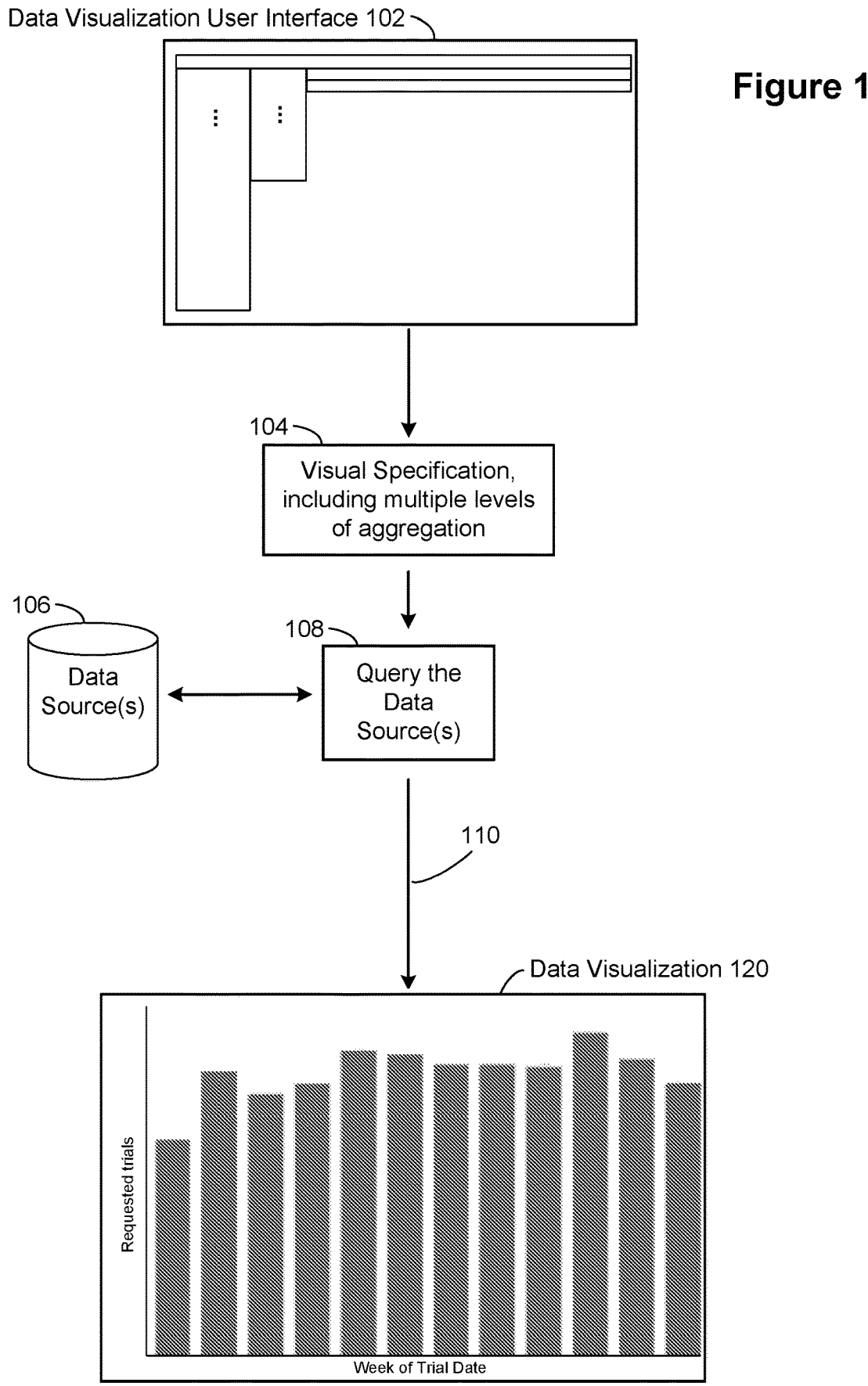
FIG. 1 illustrates conceptually a process of building a data visualization in accordance with some implementations.

Some implementations of an interactive data visualization application, use a data visualization user interface 102 to build a visual specification 104, as shown in FIG. 1. Each data visualization uses data from one or more data sources 106, which may be stored locally (e.g., on the same device that is displaying the user interface 102) or may be stored externally (e.g., on a database server or in the cloud). In disclosed implementations, the visualization specification 104 includes two or more aggregations based on different levels of detail, as illustrated in the examples below. In some instances, the output of one aggregation is referenced by a second aggregation. In some instances, the output of the first aggregation is aggregated again in the second aggregation (although not necessarily aggregated in the same way). In some instances, the output of the first aggregation is used to determine how the data is grouped for the second aggregation. Both of these are examples of "referencing" the output of the first aggregation.

The data visualization application 222 (or web application 322) queries (108) the data sources 106, and then generates (110) a data visualization 120 corresponding to the retrieved data.

Figure 2:
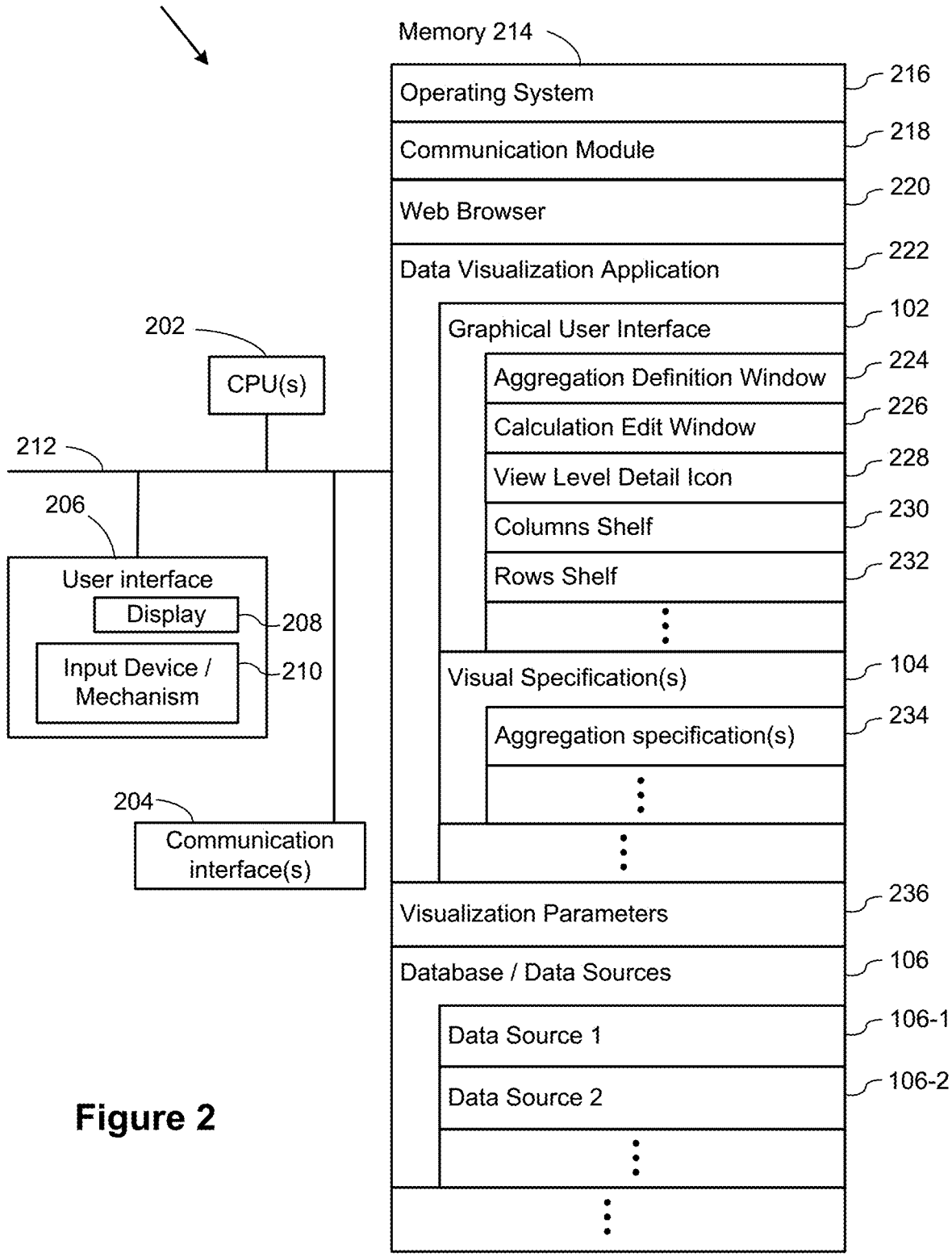
FIG. 2 is a block diagram of a computing device according to some implementations.

FIG. 2 is a block diagram illustrating a computing device 200 that can execute the data visualization application 222 or the data visualization web application 322 to display a data visualization 120. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

Figure 4:
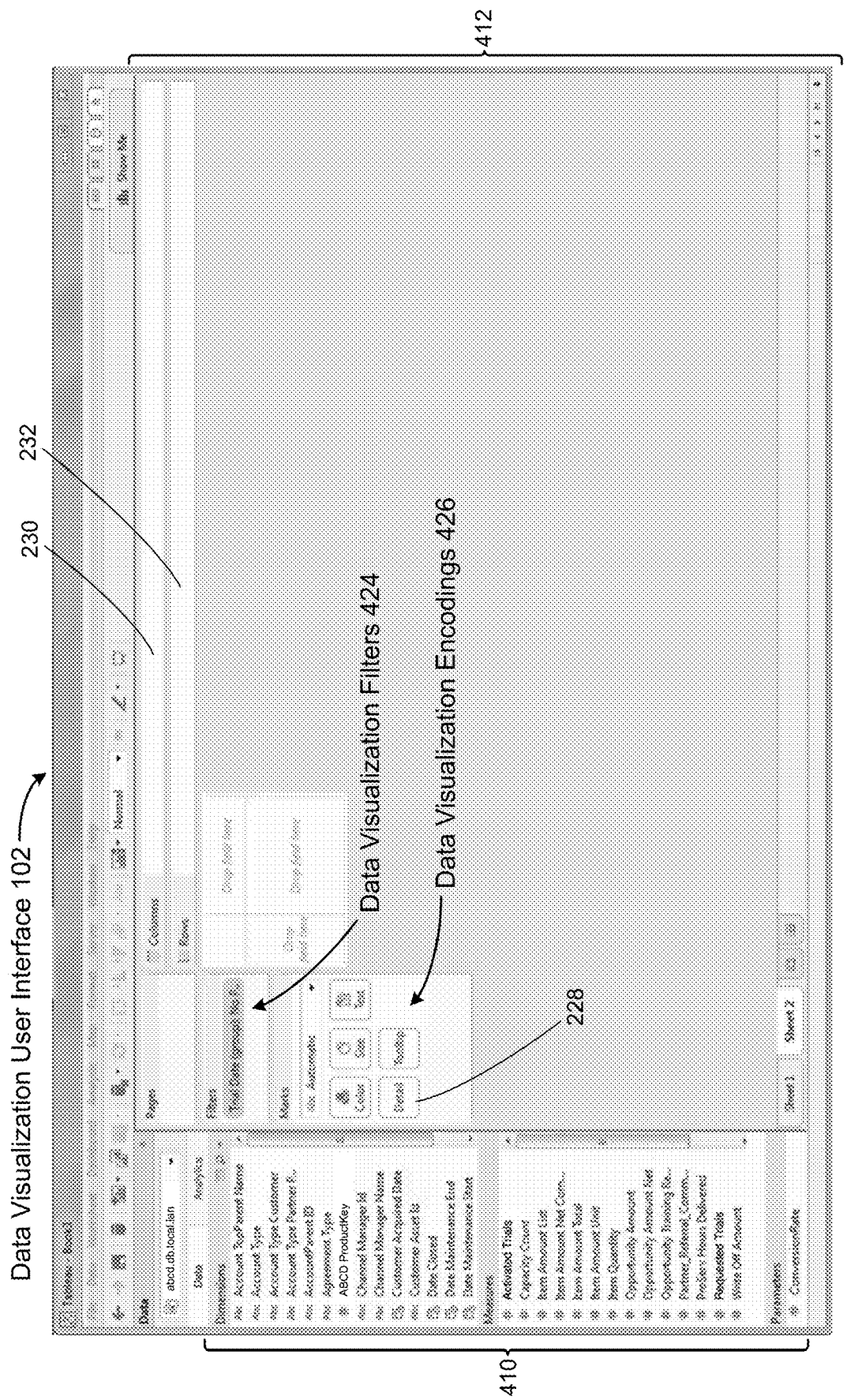
FIG. 4 provides an example data visualization user interface according to some implementations.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPUs 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which provides enables a user to build a data visualization by specifying elements visually, as illustrated in FIG. 4 below;
- in some implementations, the user interface 102 includes an aggregation definition window 224, as illustrated below in FIGS. 5B-5F. In some implementations, the aggregation definition window 224 is a separate window (e.g., a separate window object from the point of view of the operating system). In some implementations, the aggregation definition window 224 is an area, region, or pane within a larger window. As illustrated in FIGS. 5B-5F, the aggregation definition window 224 enables a user to specify what aggregation operator is used (e.g., SUM, COUNT, MIN, MAX, or AVERAGE) and how the data is grouped for the aggregation;
- in some implementations, the user interface 102 includes a calculation edit window 226, as illustrated below in FIGS. 6C and 6D. The calculation edit window can be a separate window (as illustrated in FIGS. 6C and 6D), or an area, region, or pane within a larger window. In some implementations, the calculation edit window allows a user to enter or edit expressions of any complexity (e.g., expressions that are parsable according to a specified expression syntax);
- in some implementations, the user interface 102 includes a view level detail icon 228, as illustrated in FIG. 4. The view level detail icon 228 enables a user to specify a level of detail that applies to the data visualization overall or to specify additional fields that will be included in the overall level of detail (in addition to those that are included by default). Typically, implementations have only one "overall" level of detail. Other levels of detail may be specified within individual contexts, as described below;
- in some implementations, the user interface 102 includes a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks);
- visual specifications 104, which are used to define characteristics of a desired data visualization. In some implementations, a visual specification 104 is built using the user interface 102. A visual specification may include one or more aggregations that are based on aggregation specifications 234. As explained in more detail below, an aggregation specification 234 specifies what data is being aggregated, what aggregation operator to use, and how the data is grouped for the aggregation. For example, an aggregation may aggregate Sales, use the SUM aggregation operator, and aggregate based on State. In this example, each State has a separate SUM of Sales. In some implementations, an aggregation can also specify filtering, as described in more detail below;

visualization parameters 236, which contain information used by the data visualization application 222 other than the information provided by the visual specifications 104 and the data sources 106; and zero or more databases or data sources 106 (e.g., a first data source 106-1 and a second data source 106-2), which are used by the data visualization application 222. In some implementations, the data sources can be stored as spreadsheet files, CSV files, XML, files, flat files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
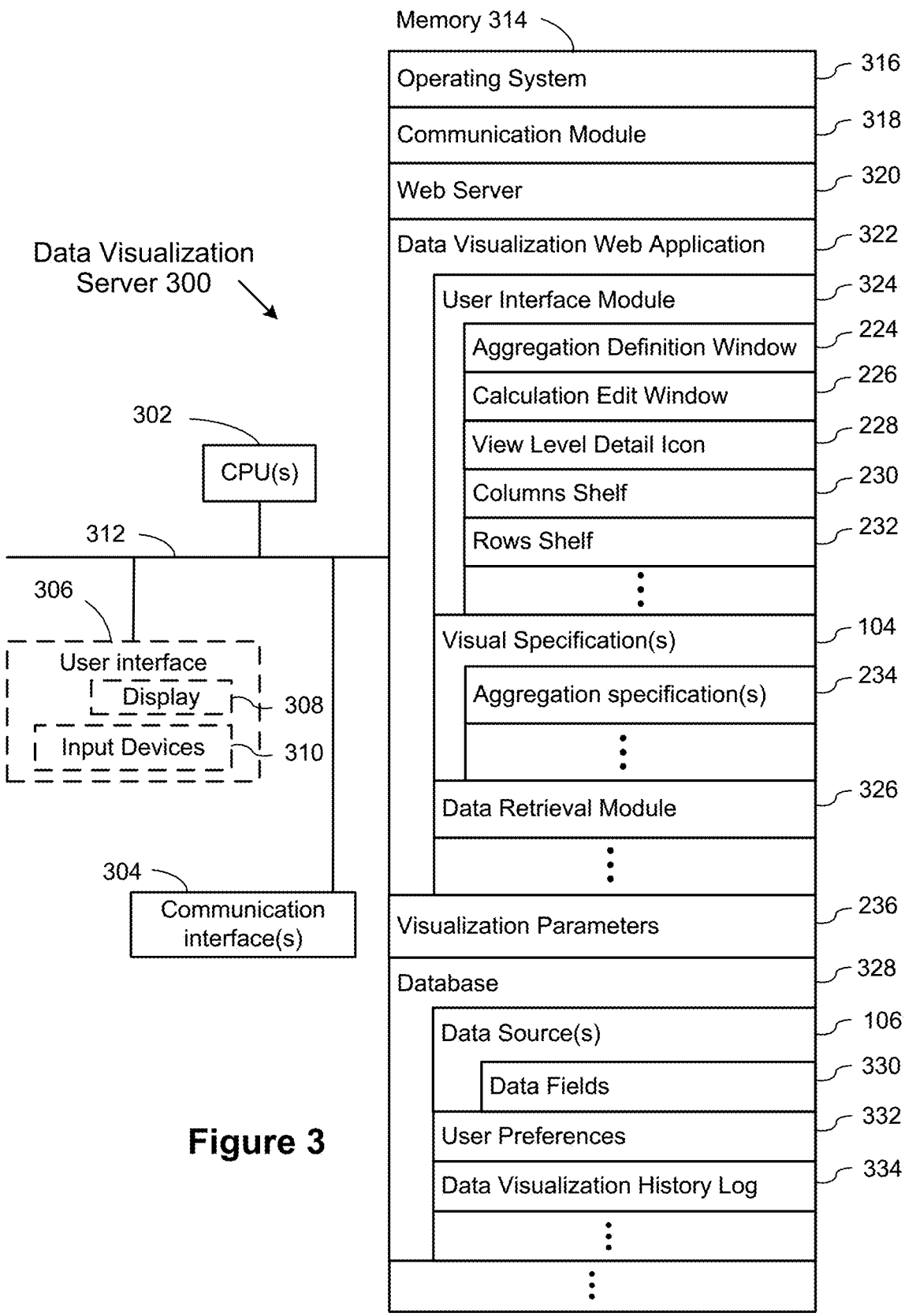
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 may include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. The user interface module 324 may include an aggregation definition window 224, a calculation edit window 226, a view level detail icon 228, a columns shelf 230, and/or a rows shelf 232, as described above with respect to FIG. 2. In some implementations, the web application includes a data retrieval module 326, which builds and executes queries to retrieve data from one or more data sources 106. The data sources 106 may be stored locally on the server 300 or stored in an external database 328. In some implementations, data from two or more data sources may be blended. In some implementations, the data retrieval module 326 uses a visual specification 104 to build the queries, which may include one or more aggregate specifications 234, as described above with respect to FIG. 2;

one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences 332. In some implementations, the database 328 includes a data visualization history log 334. In some implementations, the history log 334 tracks each time the data visualization renders a data visualization.

The databases 328 may store data in many different formats, and commonly includes many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences 332 for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

FIG. 4 shows a data visualization user interface 102 in accordance with some implementations. The user interface 102 includes a schema information region 410, which is also referred to as a data pane. The schema information region 410 provides named data elements (field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions, such as a columns shelf region 230 and a rows shelf region 232. These are also referred to as the column shelf 230 and the row shelf 232. As illustrated here, the data visualization region 412 also has a large space for displaying a visual graphic. Because no data elements have been selected yet, the space initially has no visual graphic.

A user selects one or more data sources 106 (which may be stored on the computing device 200 or stored remotely), selects data fields from the data source(s), and uses the selected fields to define a visual graphic. The data visualization application 222 displays the generated graphic 120 in the data visualization region 412. In some implementations, the information the user provides is stored as a visual specification 104. In some implementations, the data visualization region 412 includes a region 424 for data visualization filters and an encodings region 426 to specify various encodings. In some implementations, the encodings region 426 includes a view level detail icon 228, which can be used to specify or modify the level of detail for the data visualization.

FIGS. 5A-5G provide an example of building a data visualization that uses two distinct levels of detail. In this example, an analyst has transactional data for customer purchases of a period of several years. The transactions identify the customer (e.g., by customer_id) as well as the region of the United States where the customer is located. The analyst wants to compare average customer sales per year across the regions. For the final data visualization, the aggregation is by region, but the data to be compared needs to be aggregated by customer and year.

Figure 5A:
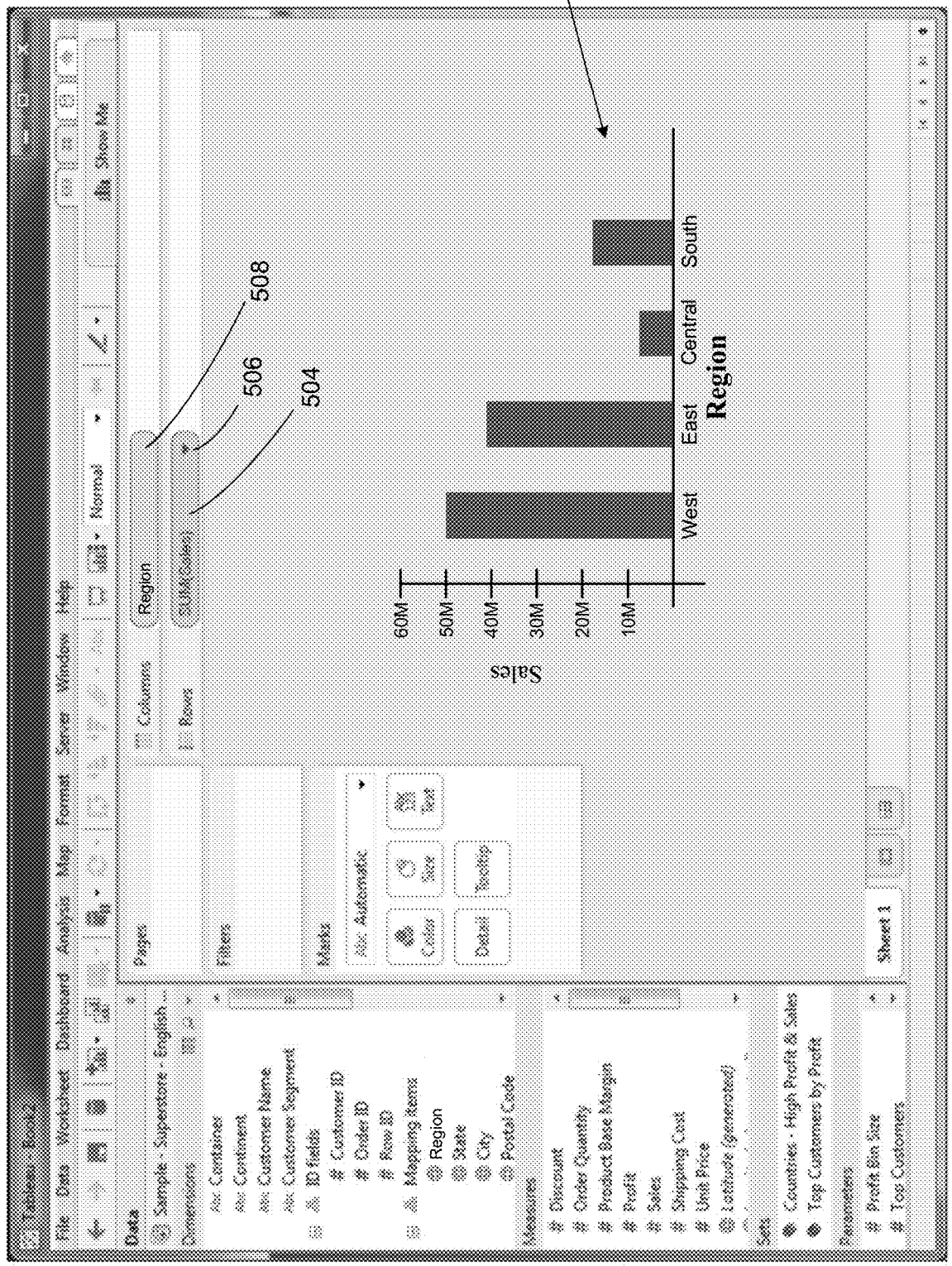
FIGS. 5A-5G provide a first example of using a graphical user interface to build a data visualization that uses multiple levels of detail in accordance with some implementations.

In FIG. 5A, a user has placed the "Region" pill 508 on the columns shelf 230, and placed the "Sales" pill 504 on the rows shelf 232, which by default is aggregated to SUM (Sales). The Sales pill 504 includes a drop down icon 506, which is used in some implementations to initiate editing of the pill. Based on this data in the columns and rows shelves, the data visualization 502 displays total sales within each region. No filters have been applied, so the totals include all of the data in the database. For example, if the database contains ten years of data, the displayed chart 502 includes data for all ten years.

Figure 5B:
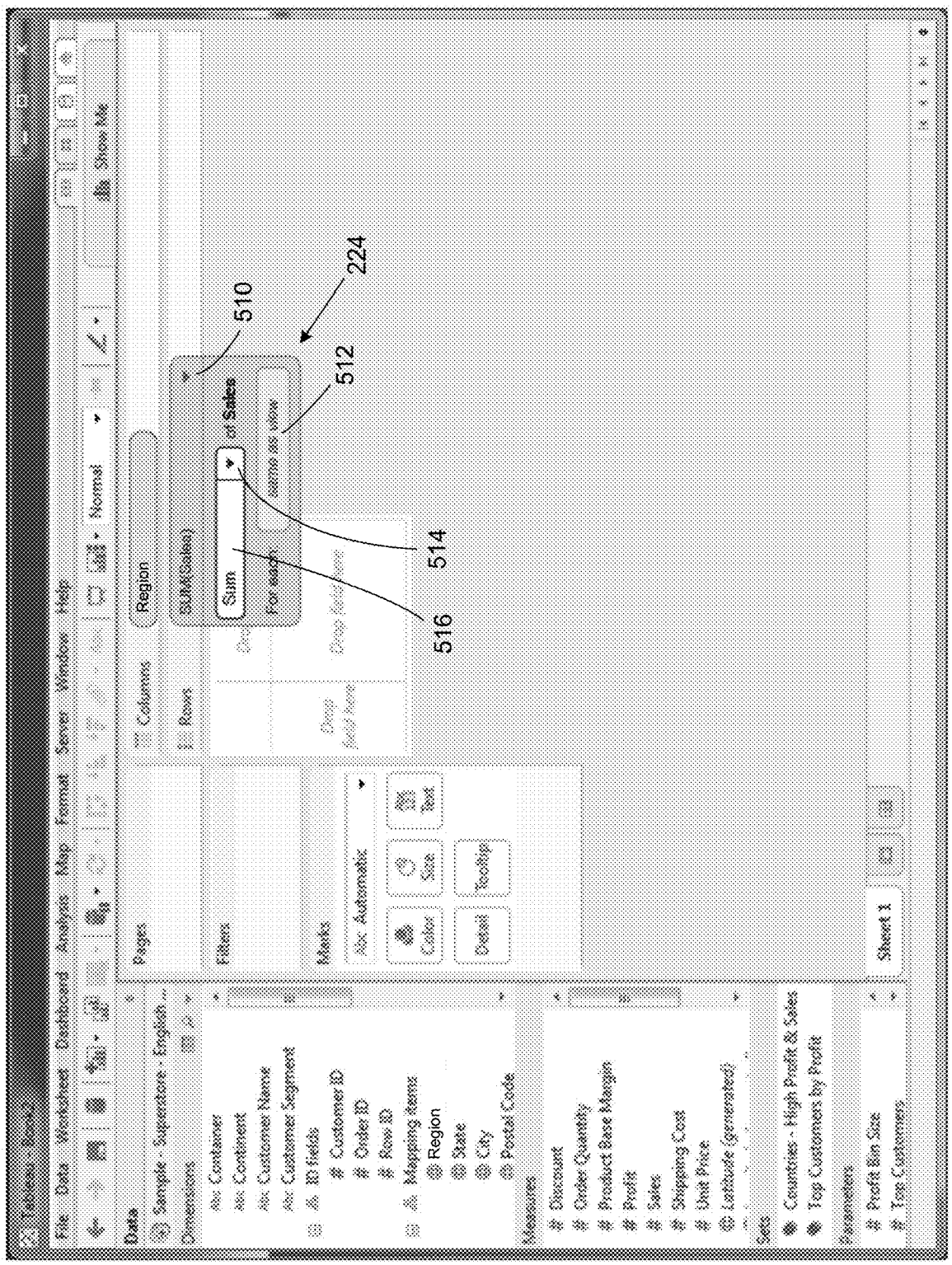

The user clicks on the drop down icon 506 to open the aggregation definition window 224, as shown in FIG. 5B. This window 224 includes an icon 510 as well, which in some implementations is used to close the window 224. The aggregation uses the Sum operator 516, and the aggregation drop down 514 enables the user to select an alternative aggregation (e.g., COUNT, MIN, MAX, or AVERAGE). When the window 224 opens, the data is aggregated "same as view," as shown in the grouping region 512. This indicates that the aggregation is performed at the same level of detail as the overall view.

Figure 5C:
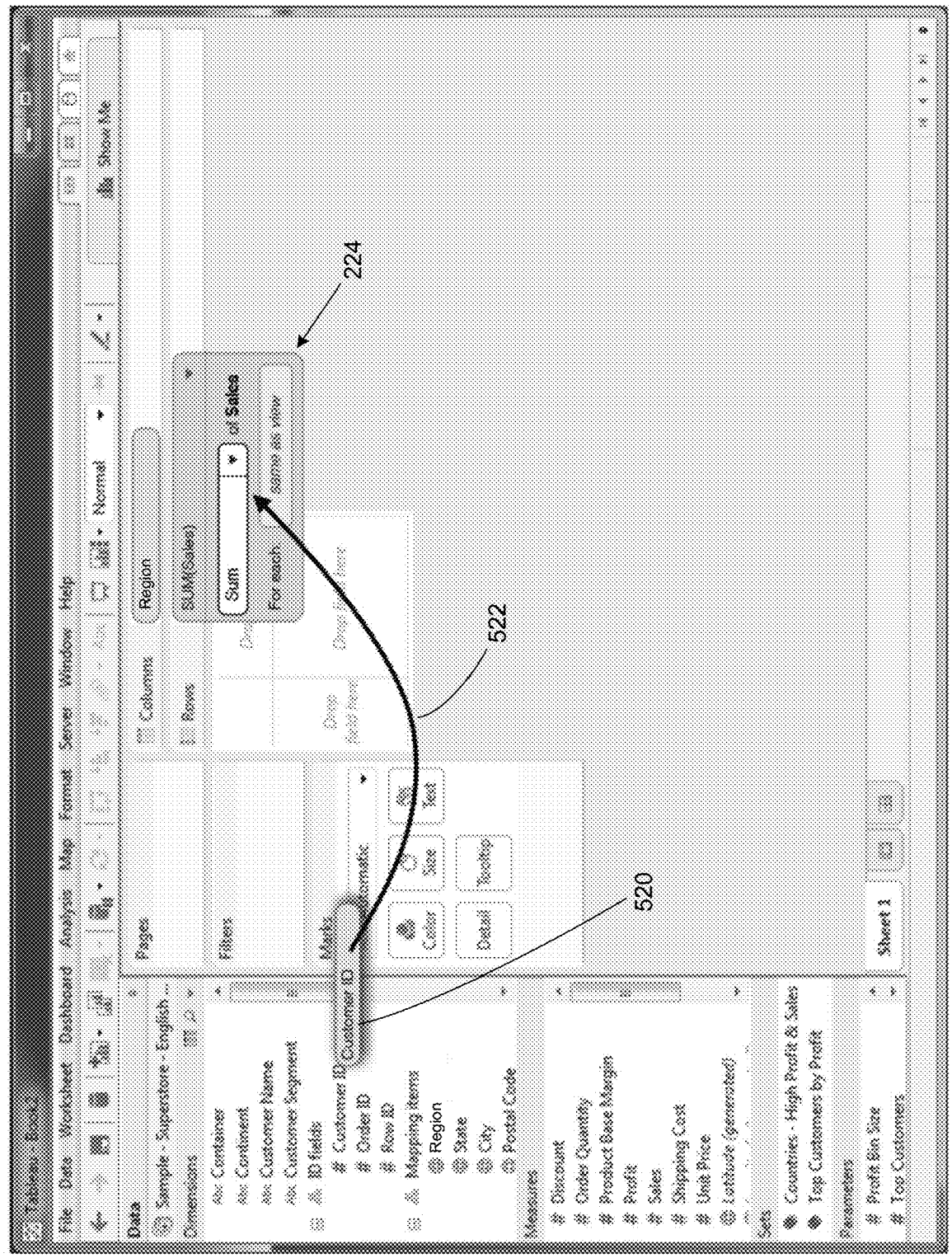
Figure 5D:
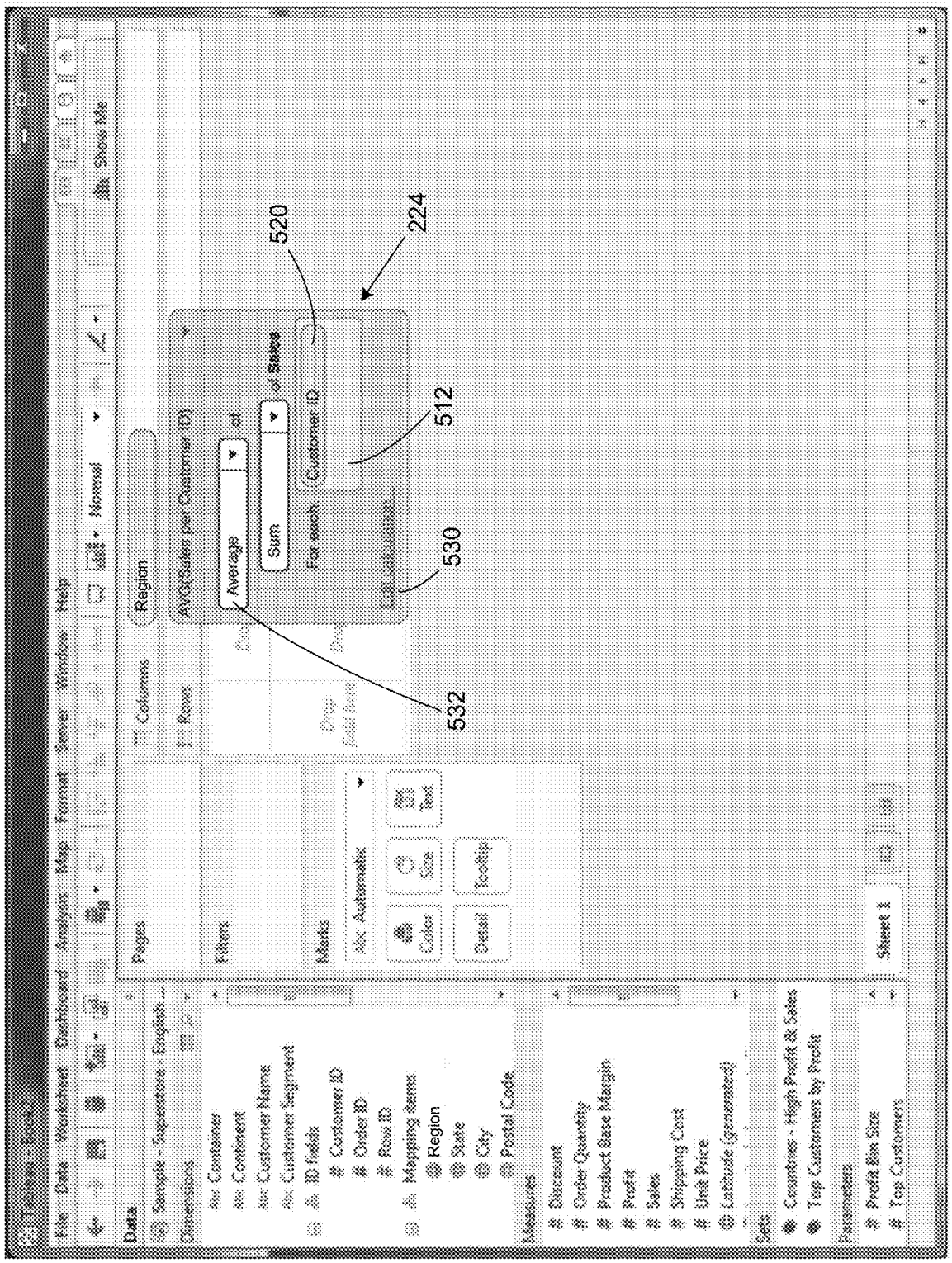

In FIG. 5C, the user drags (522) the customer ID field 520 to the aggregation definition window 224 and drops it in the vicinity of the grouping region 512. As shown in FIG. 5D, the Customer ID field 520 is now in the grouping region 512. In some implementations, when the user changes the grouping for the aggregation, the aggregation definition window 224 automatically adds a second level of aggregation 532, which uses the lower level aggregation as input. In some implementations, the default aggregation operator for the new aggregation is based on the aggregation operator used at the lower level. In this case, because the lower level uses a SUM, the upper level has defaulted to AVERAGE. Note that a SUM of a SUM would just be a SUM, so by default the two aggregation operators are different. In some implementations, as soon as the calculation is customized (e.g., adding the Customer ID field for grouping), an Edit Calculation link 530 is added to the aggregation definition window 224.

Figure 5E:
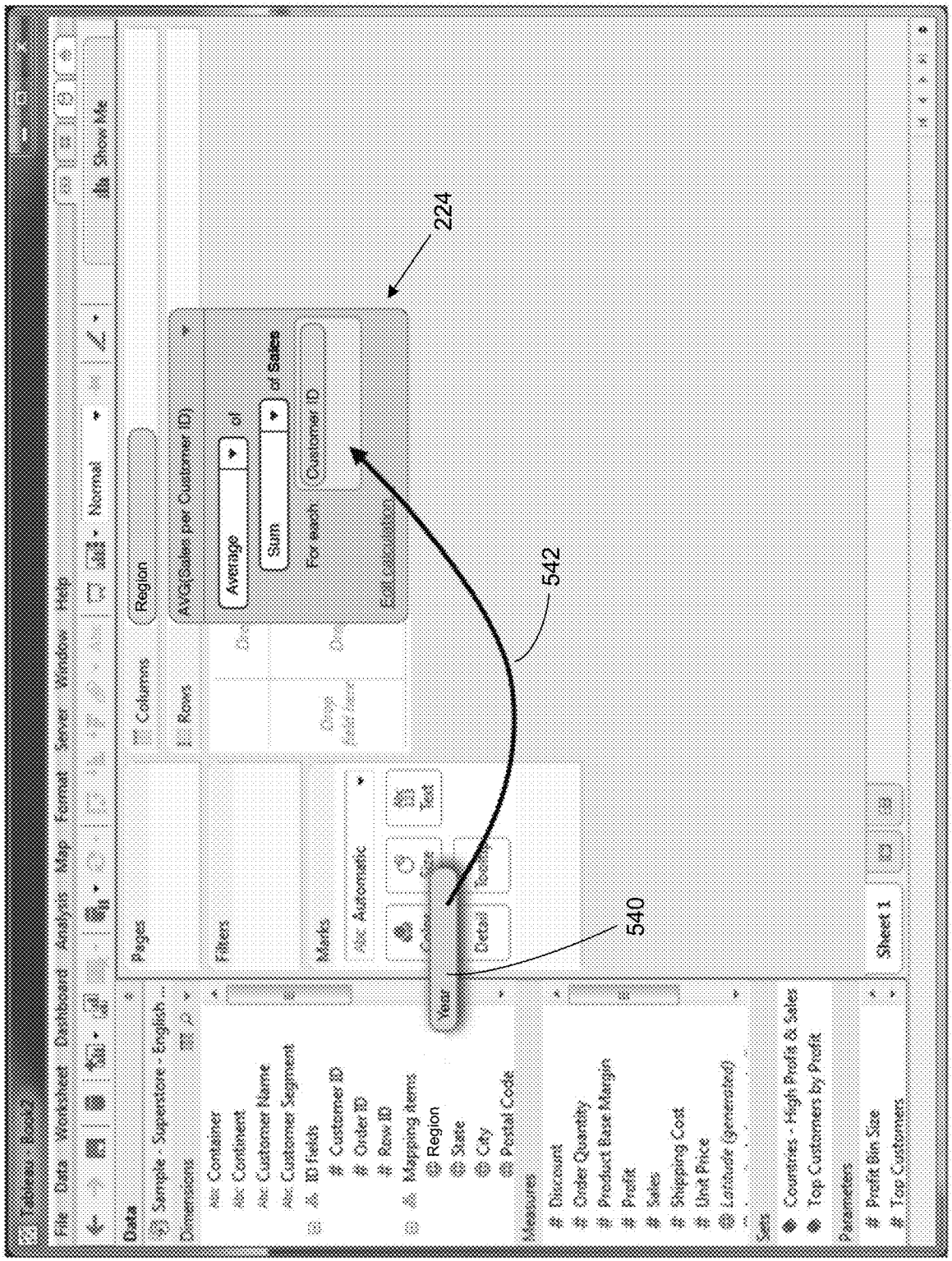
Figure 5F:
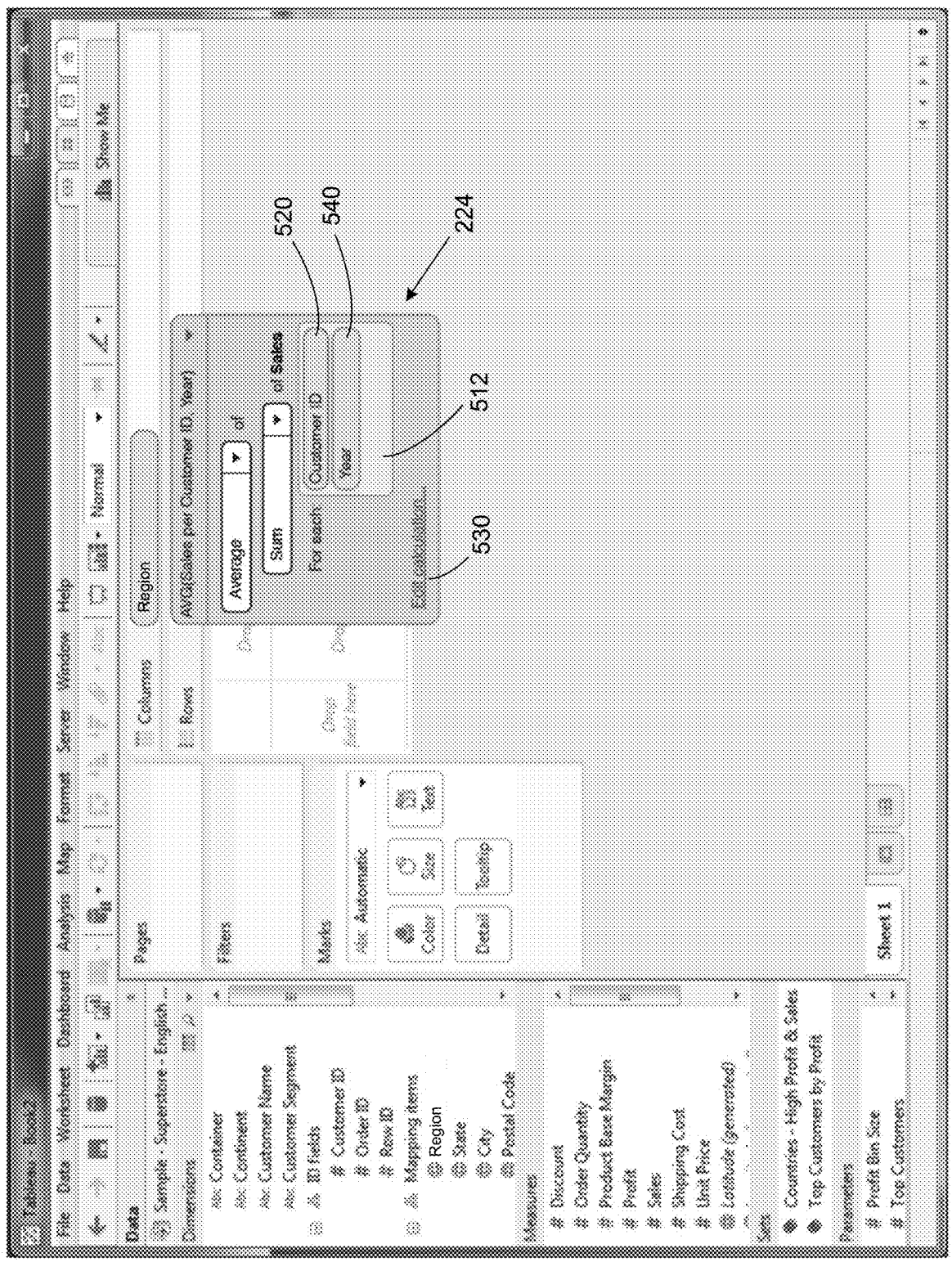

In FIG. 5E, the user drags (542) the Year field 540 to the grouping region 512, resulting in the Year field 540 being added to the grouping, as shown in FIG. 5F. At this point, the lower level aggregation will compute the SUM of Sales for each customer for each year. The upper level aggregation will then aggregate the data to compute the average for each region. In this example user interface, the higher level aggregation is by region, corresponding to the Region field in the columns shelf 230.

Note that in some cases the Year is not directly available as a field from the data source 106. For example, each transaction may have a purchase date, and the year is computed, such as YEAR(Purchase Date). In some implementations, the user could create a Year field 540 and specify the formula for how to compute it. In some implementations, a user can drag the Purchase Date field to the grouping region 512, then apply the YEAR( ) function directly in the aggregation definition window.

Figure 5G:
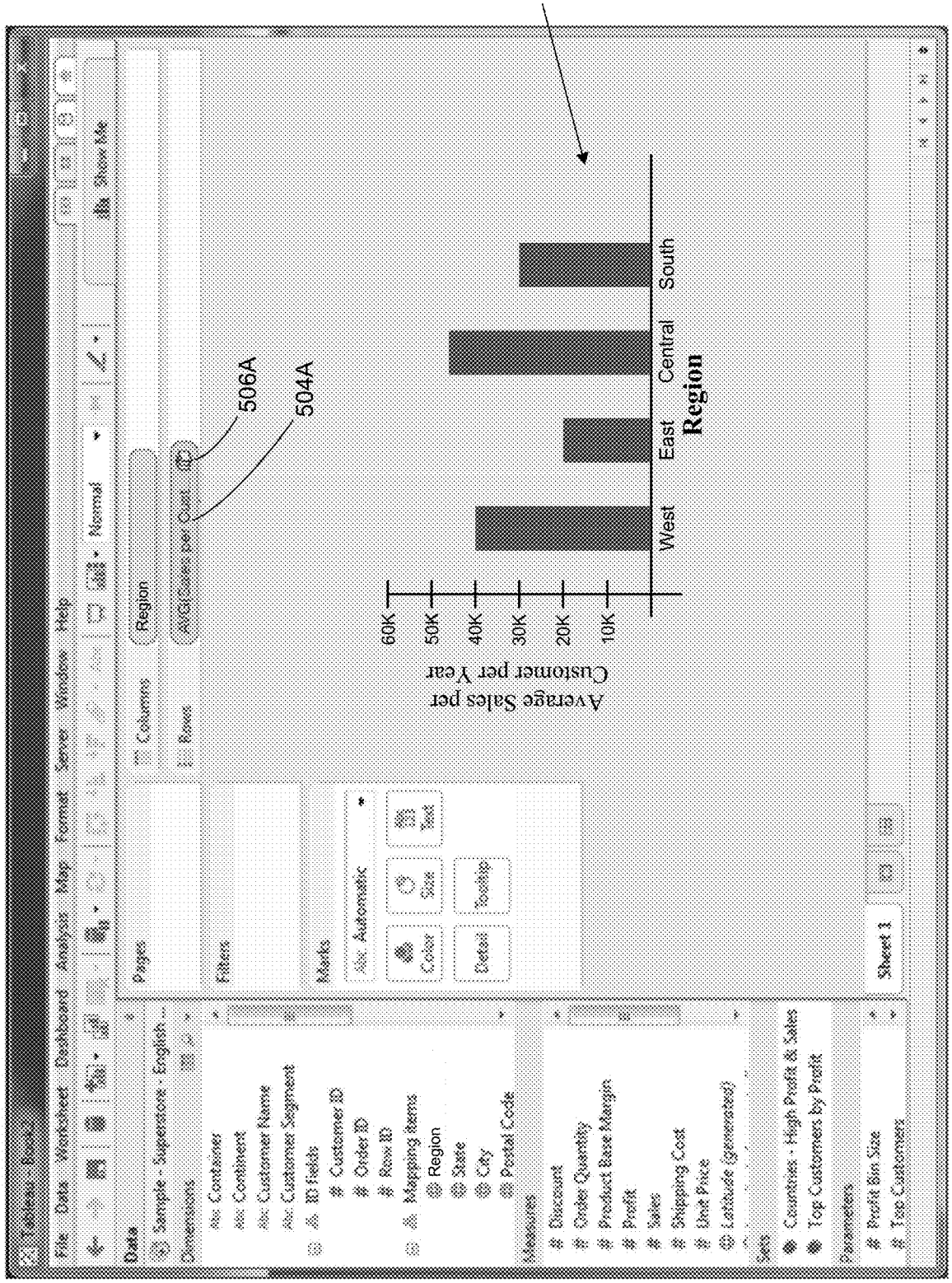

As shown in FIG. 5G, when the aggregation edit window 224 is closed, the updated data visualization 550 displays, which shows average sales per customer per year for each of the regions. Based on the edits, the former "Sales" pill 504 is now an Average Sales pill 504A, and a special calculation icon 506A replaces the standard drop down icon 506.

FIGS. 6A-6I provide an example where multiple levels of detail allow a user to conform multiple graphs to a common baseline.

Figure 6A:
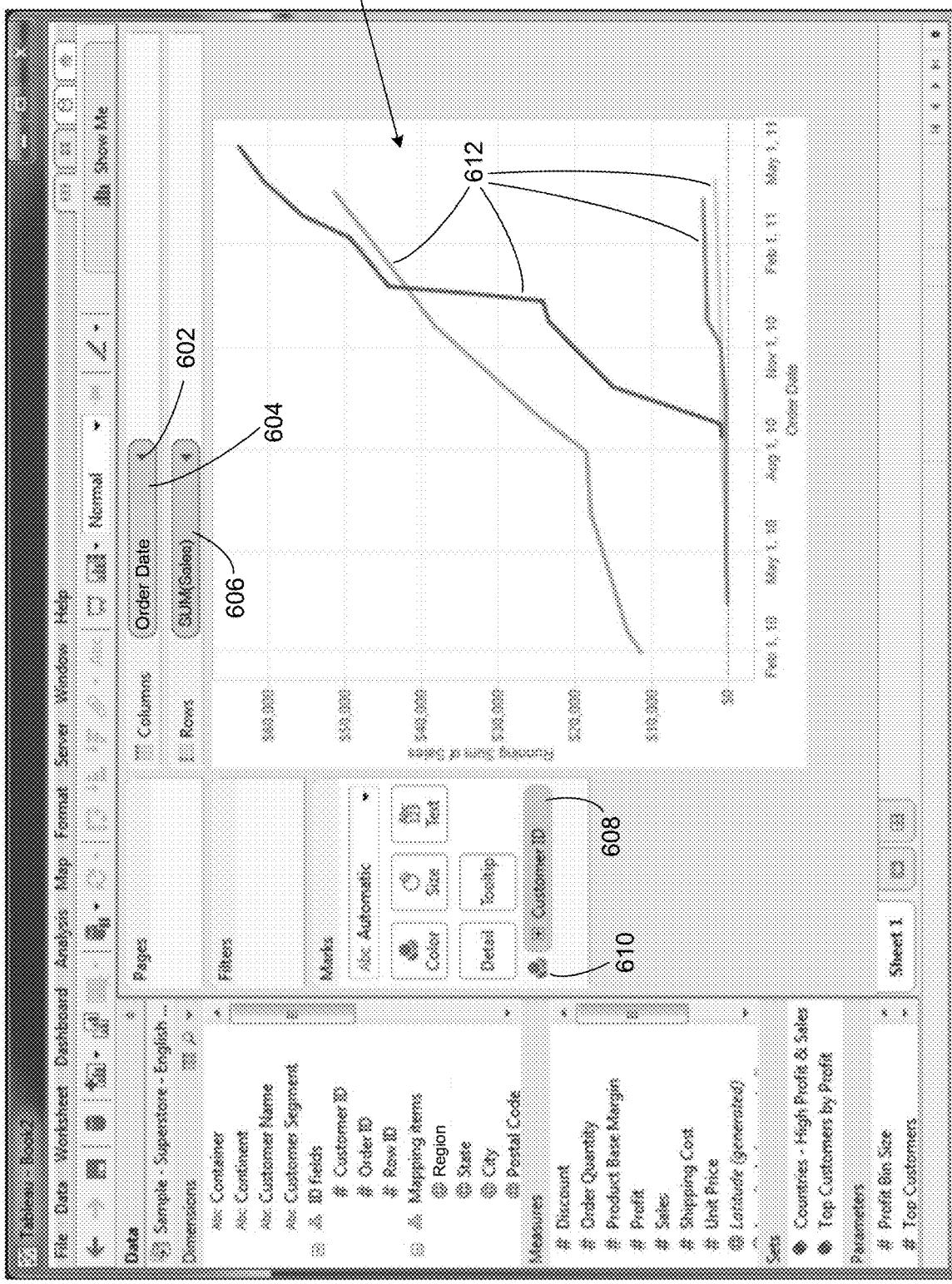
FIGS. 6A-6I provide a second example of using a graphical user interface to build a data visualization that uses multiple levels of detail in accordance with some implementations.

FIG. 6A provides a line chart that shows total Sales by Day based on user selection of Order Date 604 for the columns shelf 230 and SUM(Sales) 606 for the rows shelf 232. There are four distinct lines 612 in the data visualization 614, each line corresponding to a different customer. The lines are more distinct when displayed in color. The four separate lines are created based on the color encoding 610 using Customer ID 608. In this example, the four customers started purchasing products at different times, so it is not as easy to compare the rate of growth of the purchases among the customers.

Figure 6B:
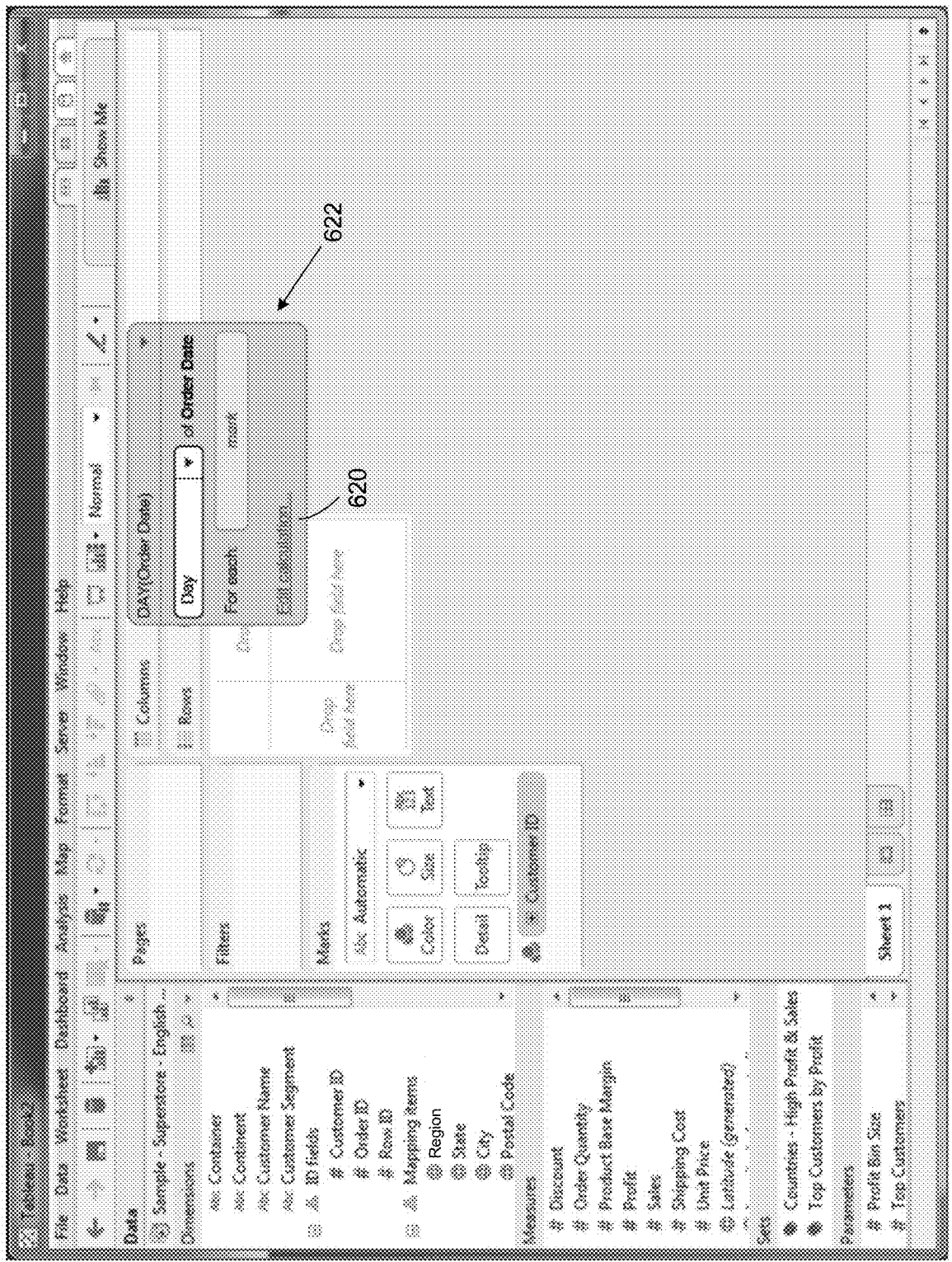
Figure 6C:
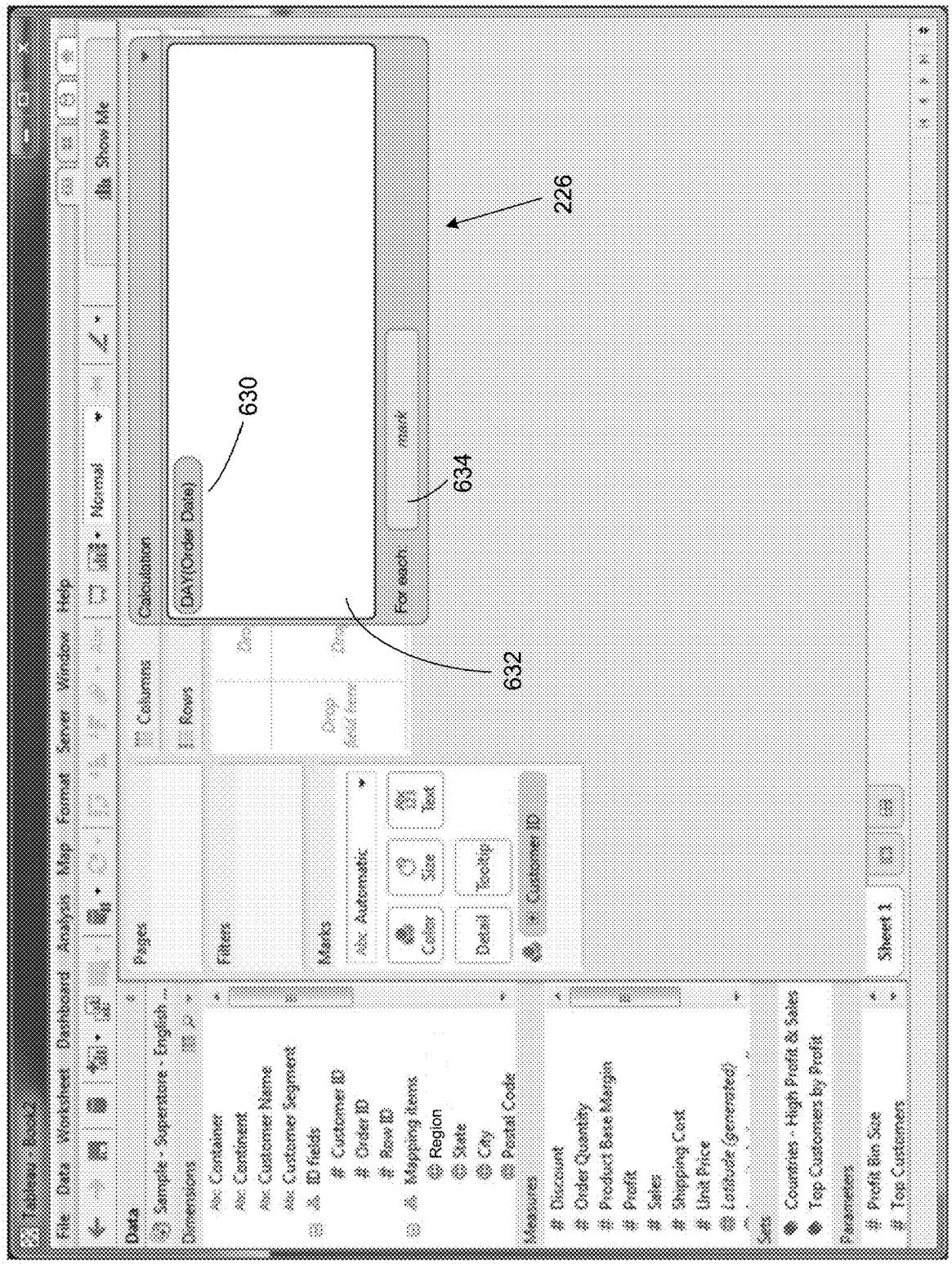
Figure 6D:
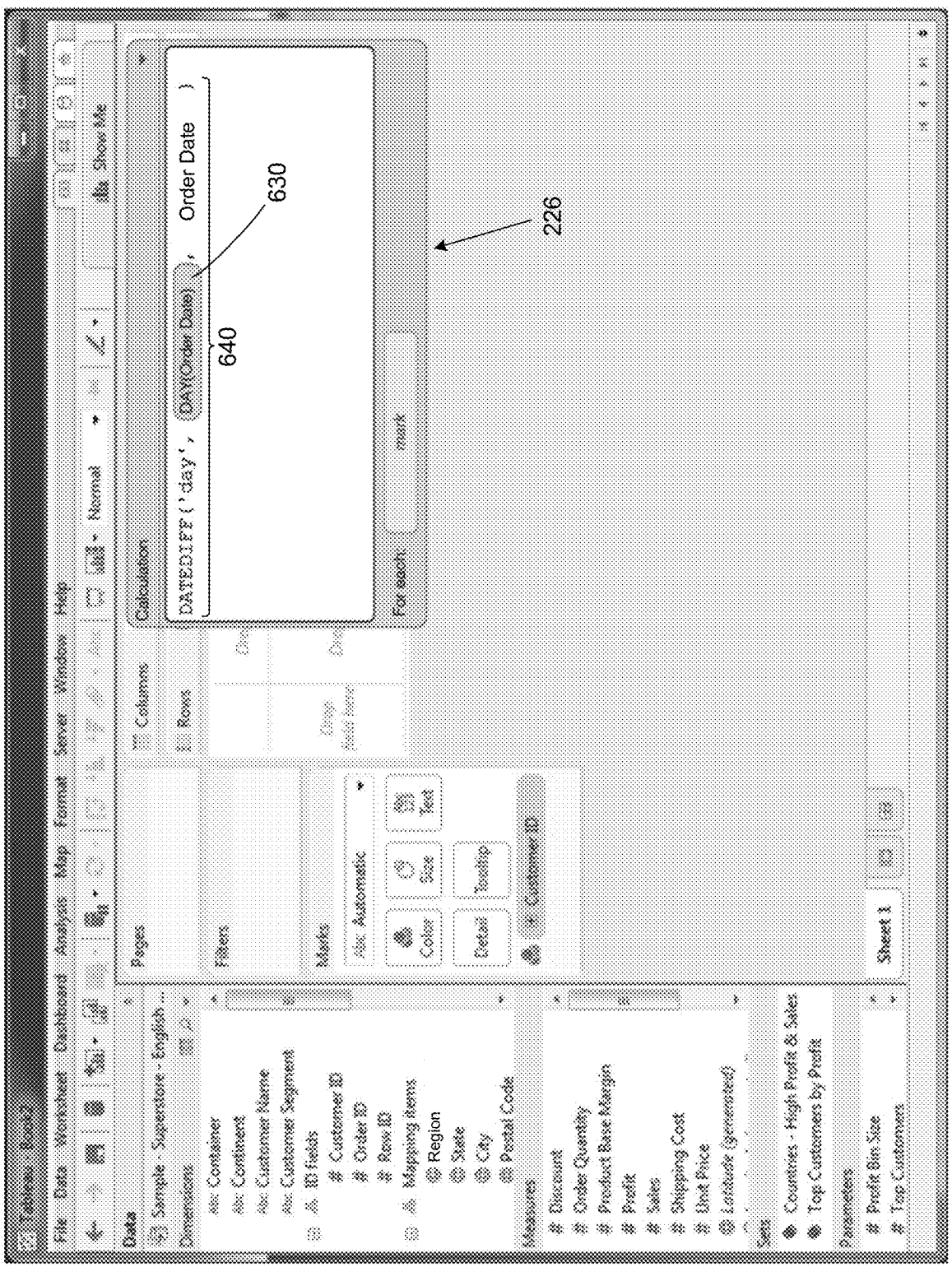

In some implementations, the user can select the Order Date pill icon 602 to bring up an expression window 622, as illustrated in FIG. 6B. Here the user has selected to apply the DAY( ) function to the Order Date field. The expression window 622 includes an Edit calculation link 620, and selecting it brings up the Calculation edit window 226, as illustrated in FIG. 6C. The calculation edit window 226 initially displays the original formula DAY(Order Date) 630 in the expression region 632. By default, the expression is evaluated for each mark, as indicated in the scope region 634.

One way to align each of the lines 612 to a common baseline is to compute the first order date for each of the companies, then subtract the first order date from each order date. In some implementations, subtraction of dates can be performed by a DATEDIFF( ) function, as illustrated in FIG. 6D. In FIG. 6D, a user has entered text into the expression region 632 to compute the number of days between two dates, forming a more complex expression 640, which includes the original DAY(Order Date) pill 630.

Figure 6E:
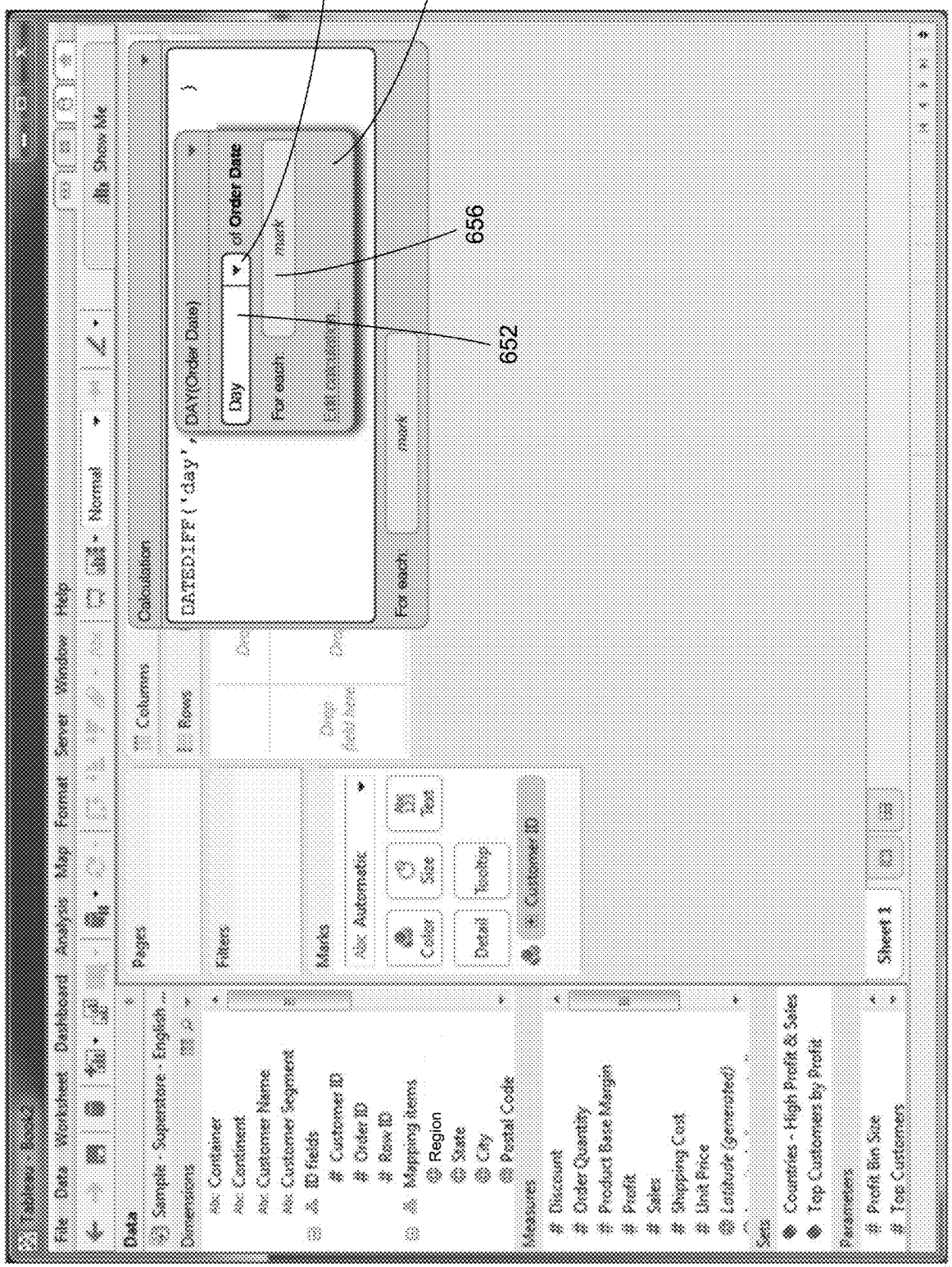

In FIG. 6E, the user has opened up the DAY(Order Date) pill 630 (e.g., by double clicking on the pill). In the illustrated implementation, the function selector 652 shows the initial selection of DAY, and there is a function selection icon 654 to choose alternative options. The expression window 650 also includes a scope selection region 656, which indicates that the function will be applied for each mark in the data visualization.

Figure 6F:
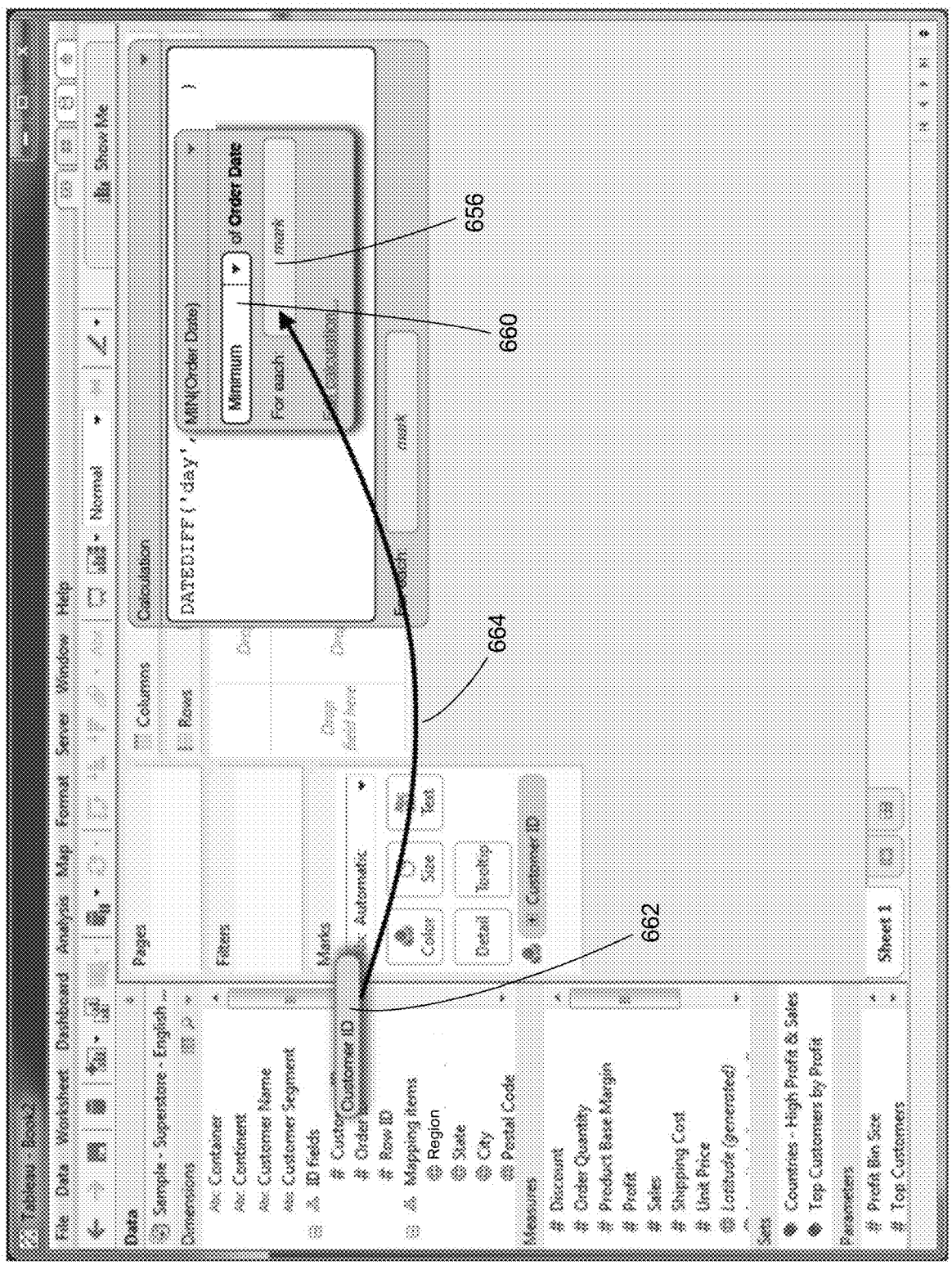
Figure 6G:
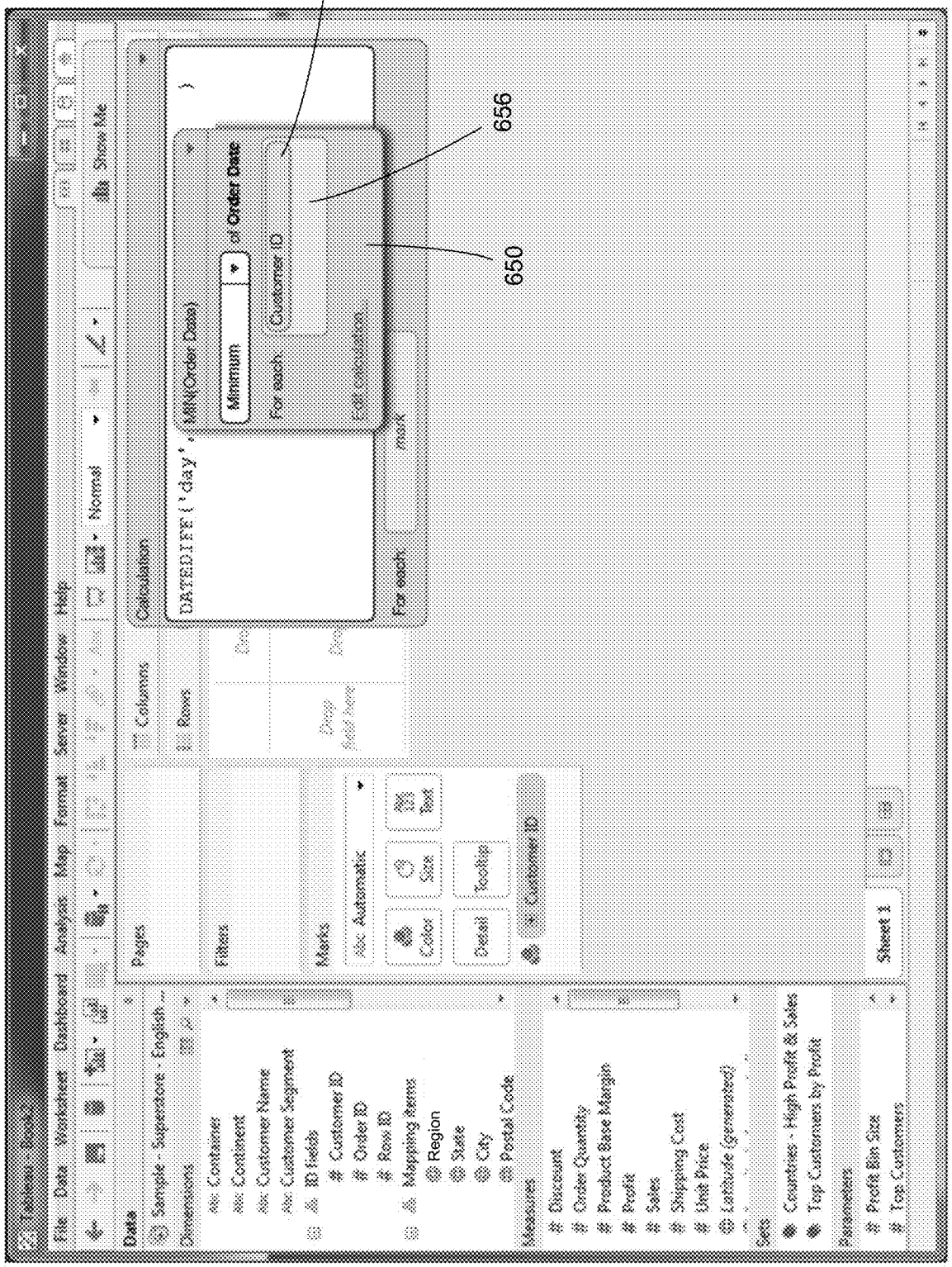

In FIG. 6F, the user has selected to use the aggregate operator MINIMUM 660, and is dragging (664) the Customer ID field 662 to the scope region 656. In FIG. 6G, the user has dropped the Customer ID field 662 into the scope region 656, so that a minimum is computed for each Customer ID.

Figure 6H:
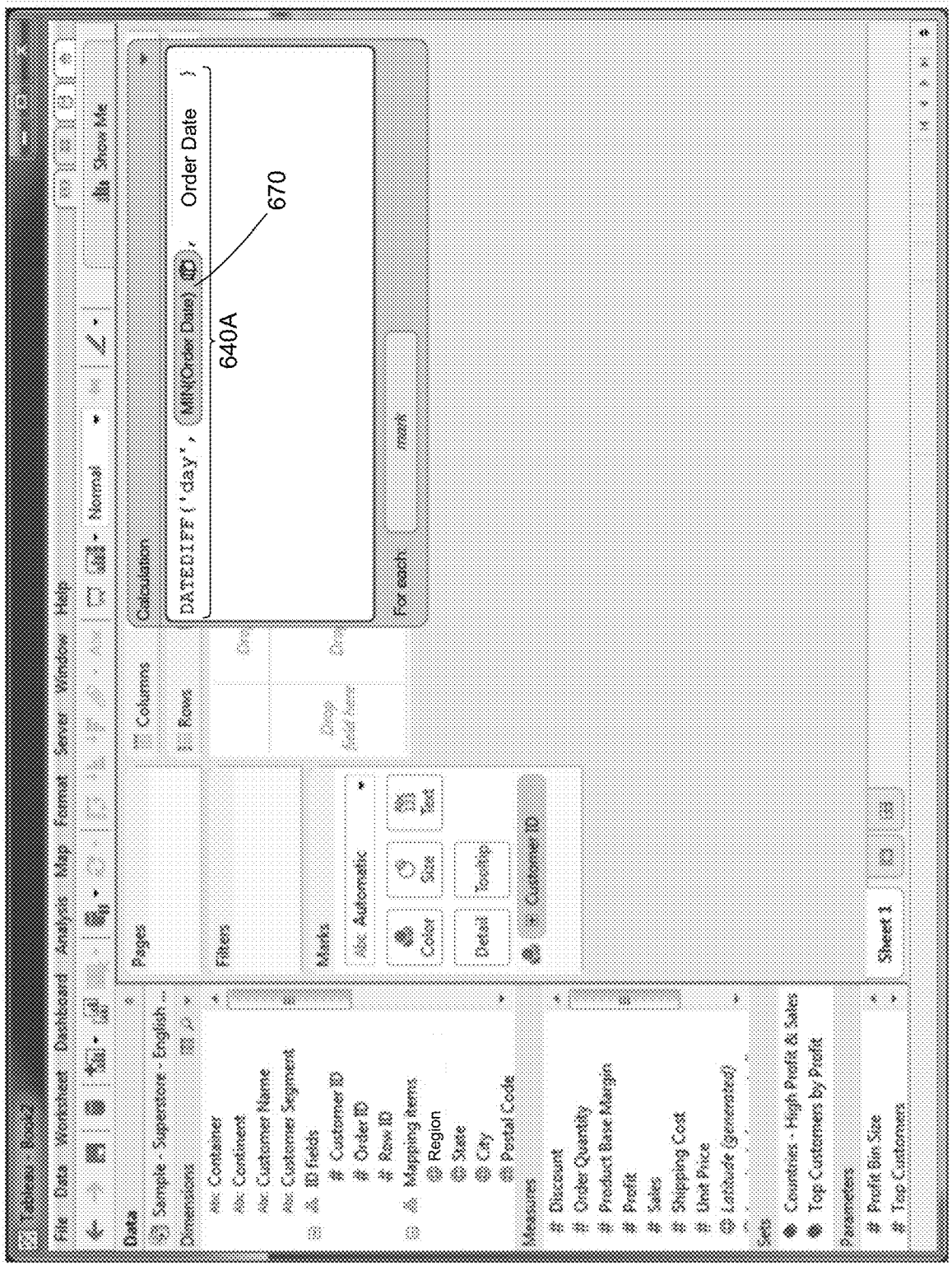

As shown in FIG. 6H, when the expression window is closed, the new expression MIN(Order Date) 670 replaces the former DAY(Order Date) 630, creating a new expression 640A, which computes the number of days between the earliest order date for each customer and a particular order date. Note that the data visualization application automatically correlates each order date with the appropriate corresponding minimum date. That is, for each order, there is a Customer ID, and that Customer ID corresponds to a specific value for MIN(Order Date), so the DATEDIFF( ) function computes the number of days between the earliest order date for that Customer ID and the Order Date for the order.

Figure 6I:
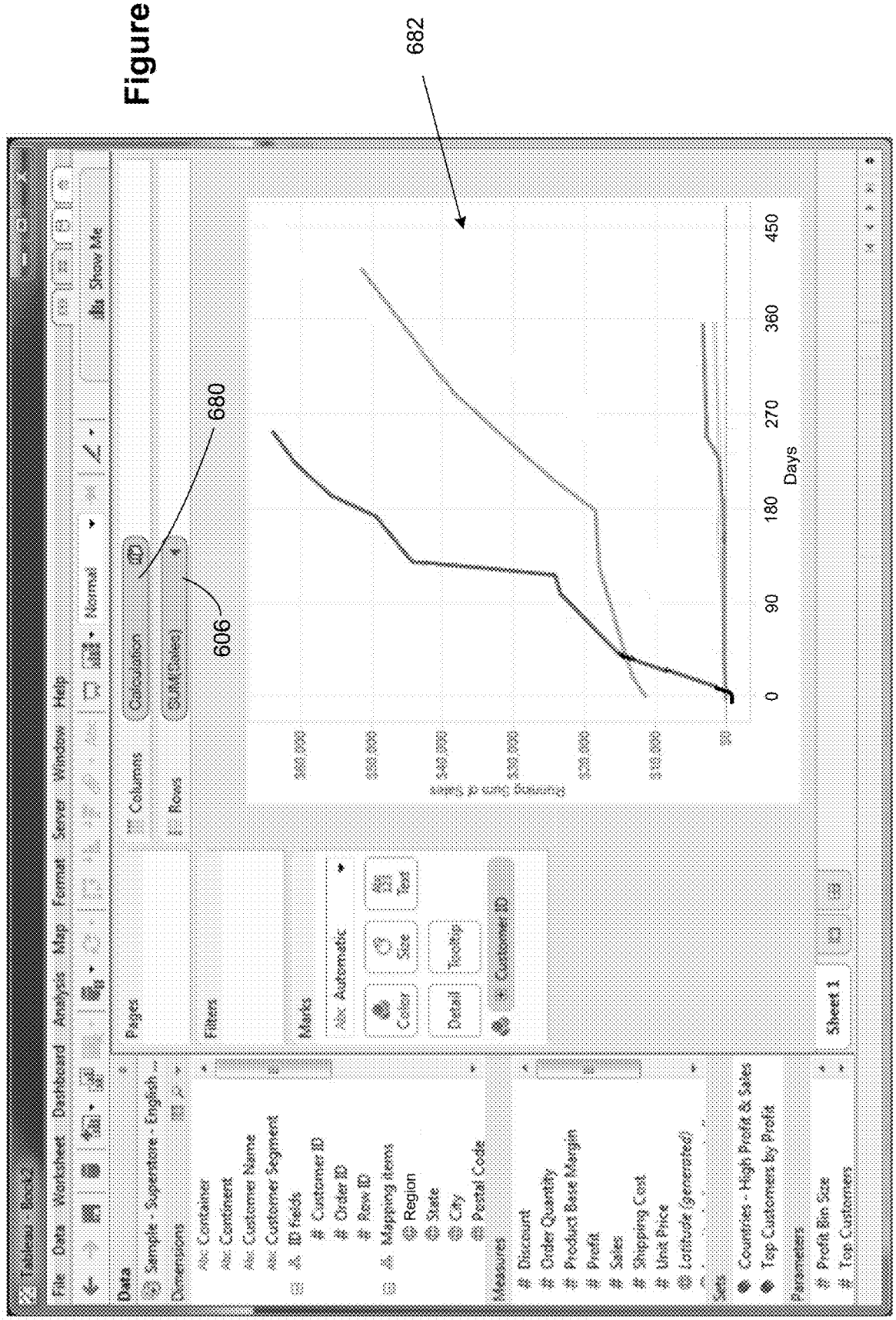

As shown in FIG. 6I, when the calculation edit window 226 is finally closed, the Calculation pill 680 replaces the Order Date pill 602 on the columns shelf 230. Now all of the lines in the data visualization 682 have a common starting point of 0, because 0 corresponds to the first order date for each of the customers. In this example, the first aggregation MIN(Order Date) is aggregated by Customer ID, and the second aggregation is at the visualization level, using both Customer ID and days from first order. The output of the first aggregation is used to form the grouping for the second aggregation.

Figure 7A:
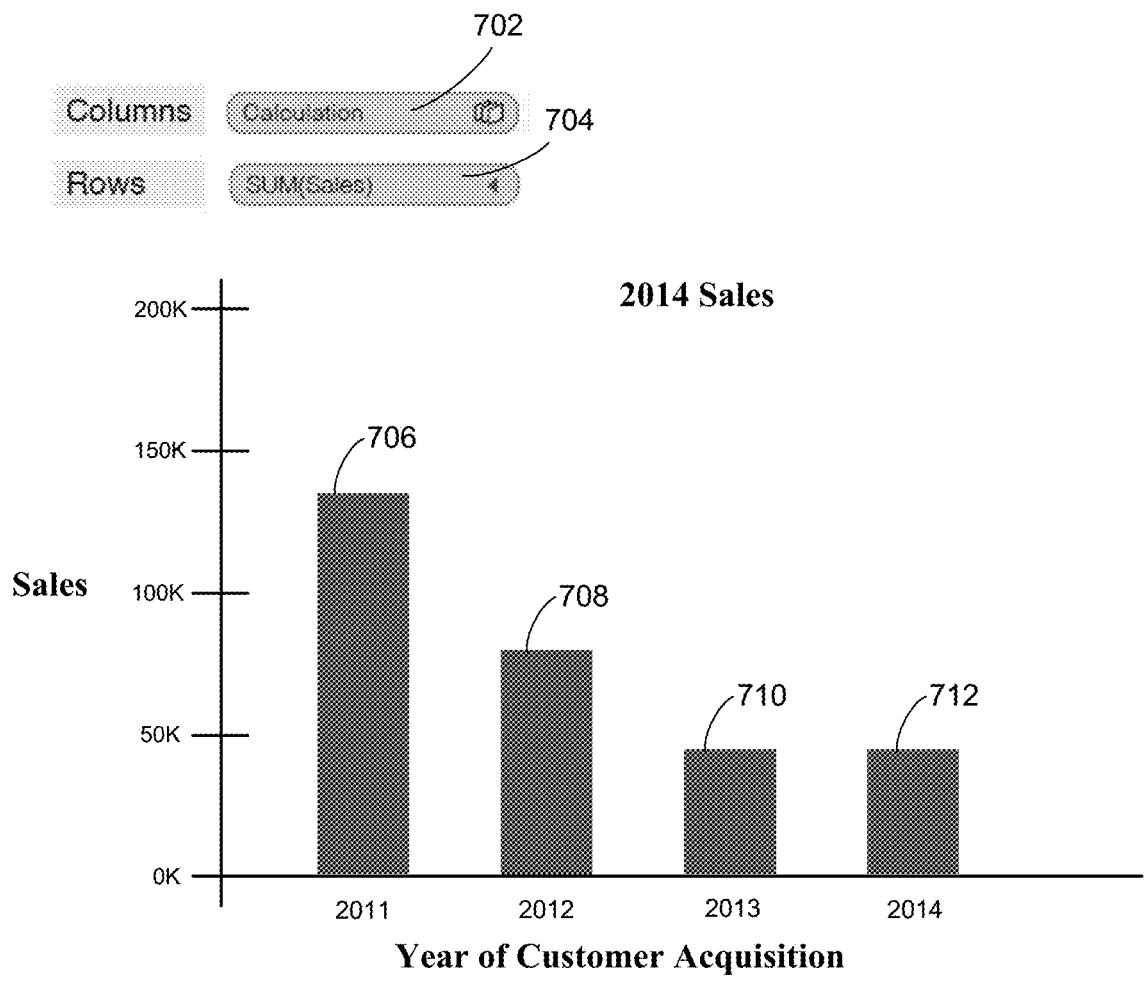
FIGS. 7A and 7B provide examples of data visualizations that were created using multiple levels of detail in accordance with some implementations.
Figure 7B:
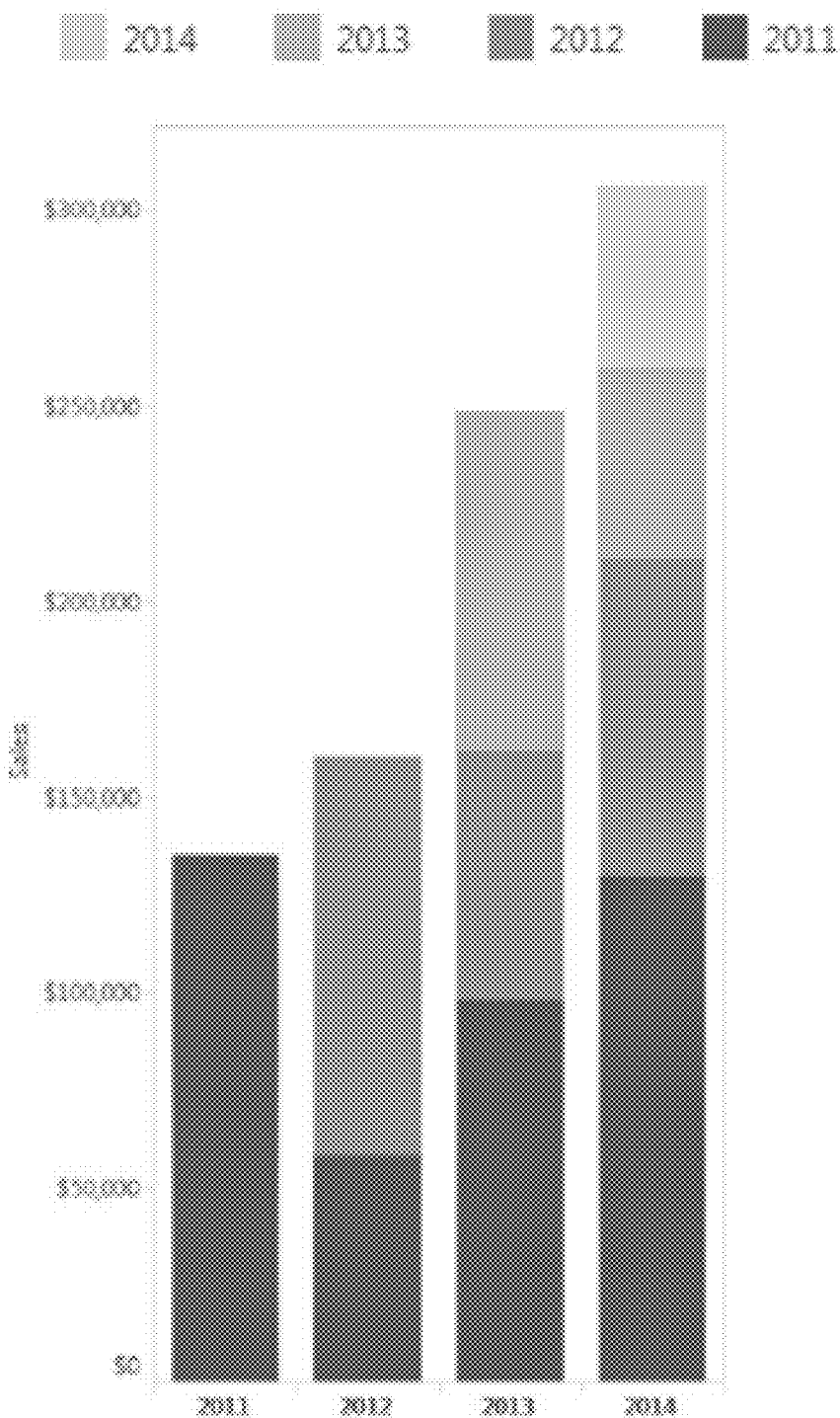

FIGS. 7A and 7B provide examples of data visualizations where sales are grouped based on when customers were first acquired. In FIG. 7A, a first aggregation is used to compute an acquisition year for each customer. For example, in some implementations the acquisition year is computed using YEAR(MIN(Order Date)), where the grouping is by Customer ID. The acquisition year calculation 702 is placed on the columns shelf 230 so that a separate column is created for each acquisition year. The SUM(Sales) 704 is placed on the rows shelf 232. The displayed bar chart shows sales for 2014, but each bar in the chart has data for different customers based on their year of acquisition. For example, the first bar 706 shows the sales for customers acquired in 2011, the second bar 708 shows the sales for customers acquired in 2012, the third bar 710 shows sales for customers acquired in 2013, and the fourth bar 712 shows sales for customers acquired in 2014.

FIG. 7B is similar to FIG. 7A, but shows sales for multiple years and uses stacked bars within each year to indicate the breakdown by year of customer acquisition. This data visualization in FIG. 7B uses the same two levels of aggregation as in FIG. 7A.

FIGS. 8A-8D provide examples of creating data visualizations to compare obesity rates among various groups of people.

Figure 8A:
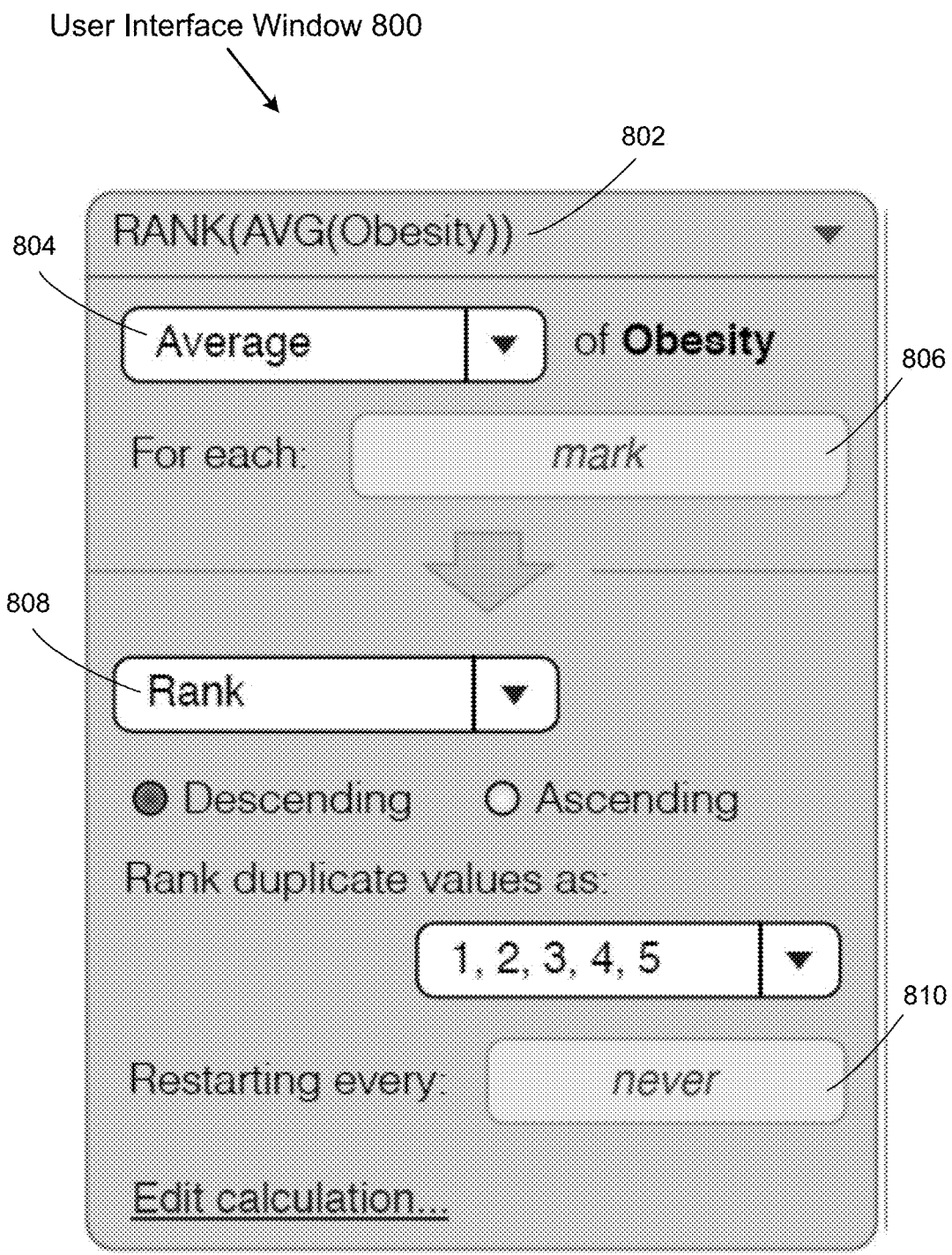

FIG. 8A is an example of a user interface window 800 for performing a table calculation using aggregated data. In this example, Obesity is a field from the underlying data set (e.g., measured as percent over ideal weight). For each designated region (e.g., each state, or each county within a state), an average is computed. Based on the aggregate averages, the regions are ranked. For example, if the regions are counties in California, the county with the highest average obesity is ranked number 1.

As shown in the user interface window 800, the formula 802 computes the rank for each region based on the computed Average 804 of Obesity. In this example, the average is computed for each mark 806. In some implementations, the average can be computed based on an alternative grouping, as illustrated above for the aggregation definition window 224 in FIGS. 5C-5F. For the illustrated table calculation, another function is applied after the initial aggregation. In this case, a Rank 808 calculation is performed in Descending order (i.e., the highest average obesity is ranked first). In some instances, it is desirable to having the ranking restart at some points (e.g., rank the obesity of counties within each state, with ranking restarting at 1 for each state). In the illustrated example, the restart selection 810 is to never restart.

The example in FIG. 8A illustrates one way for comparing obesity. Of course there are many other ways as well. For example some researchers create a binary scale that specifies whether an individual is or is not obese (e.g., based on height and gender). An aggregation of such data can then specify what percentage of the people in each region is obese.

Figure 8D:
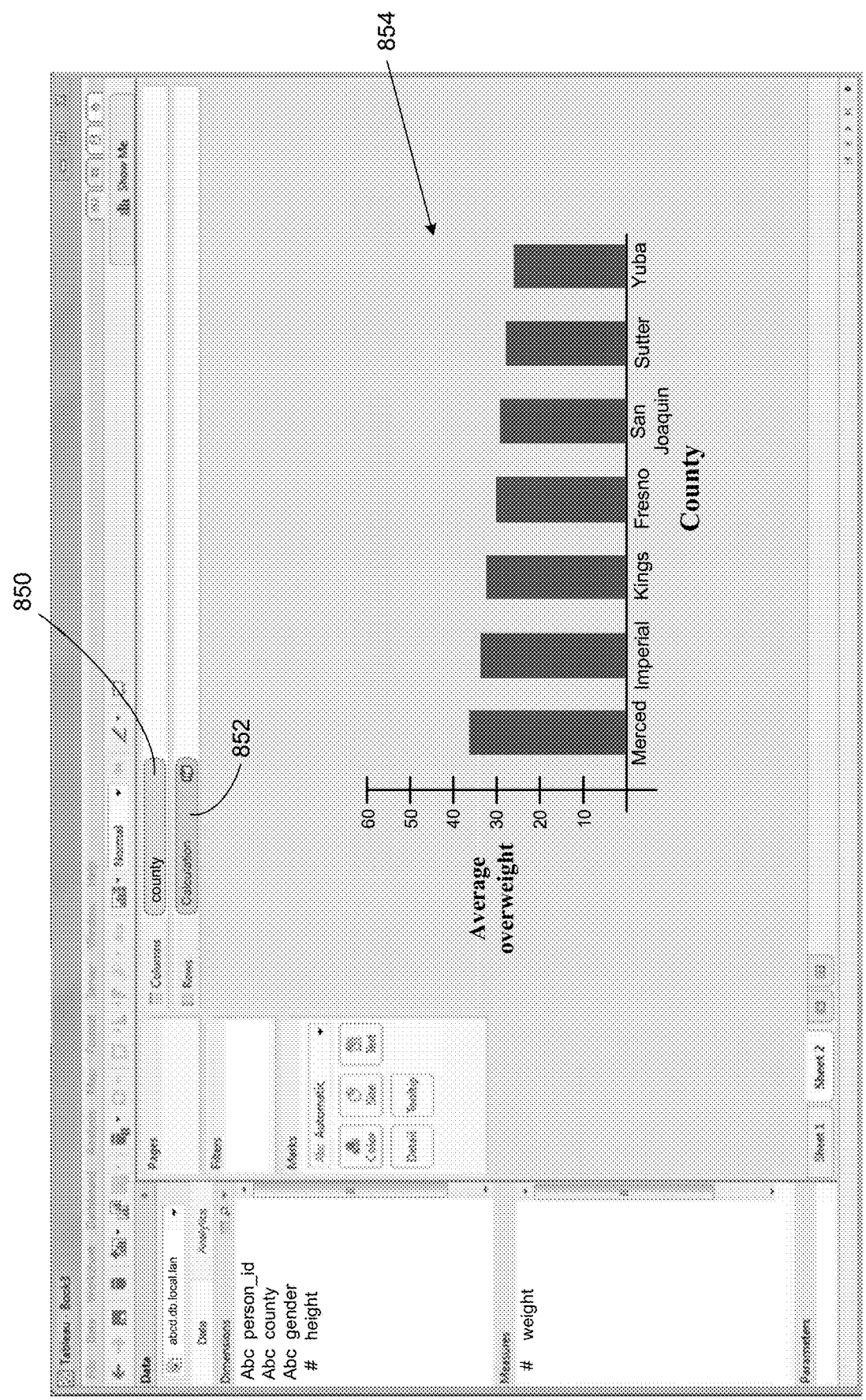

FIGS. 8B-8D illustrate using raw data to compute an average overweight metric for counties in California. In this example, rather than comparing people to an absolute standard, people are compared to the overall average. Of course, there are differences in weight based on height and gender, so an overall average is computed for each (height, gender) combination. Once the overall averages are computed, a separate county average is computed by comparing the individuals to the overall average. This example uses two very different levels of detail. The first level of detail includes data for the entire state, but groups people by age and gender. The second level of detail groups people by county.

FIG. 8B shows a table of the raw data that will be used for the data visualization. Each row corresponds to a distinct person, and uniquely identified by a person_id. The other data includes the county where the person lives, the gender of the person, and the person's height and weight.

FIG. 8C provides a formula that can be used in some implementations to perform the desired calculation with two levels of detail. For clarity, square brackets [ ] are used to identify fields from the database, braces { } are used to delineate a level of detail calculation (sometimes referred to as an "LOD expression"), and parentheses ( ) are used to specify ordinary grouping. The aggregate function AVG( ) is used to specify computing an average for each grouping. The keyword "fixed" for each LOD expression indicates that the grouping uses the specified fields and the calculation does not take into account any filters that may be applied elsewhere in the data visualization. For example, even if the data visualization were limited to displaying data for Marin and Sonoma counties, the computed overall averages would still include the data from all of the other counties in California.

The inner LOD expression {fixed [height],[gender]:AVG ([weight])} in FIG. 8C computes the average weight for each (height, gender) pair. The outer LOD expression {fixed [county]:AVG([weight]−{ . . . })} computes an average overweight amount for each county. Importantly, for each person, that person's overweight amount is computed by subtracting the appropriate average for the person's height and gender. For example, suppose the average weight for a 70 inch tall male is 160 pounds. For the person with person_id=000003, the overweight amount is computed as 200-160, which is 40. As another example, suppose the average weight for 66 inch tall females is 120. Then the person with person_id=000004 overweight amount 120-120, which is 0. That is, the overweight amount is zero. Because overweight amounts are designated as positive, a person whose weight is below the average will have a negative overweight amount.

FIG. 8D shows a data visualization 854 created based on the calculated data using two levels of detail. A user has placed the county field 850 on the columns shelf 230 and the custom calculation 852 on the rows shelf 232. In this example, the bars in the data visualization have been sorted in decreasing order.

FIGS. 9A-9E illustrate a process of displaying a data visualization that includes a total and part of the total in a single graphic.

Figure 9A:
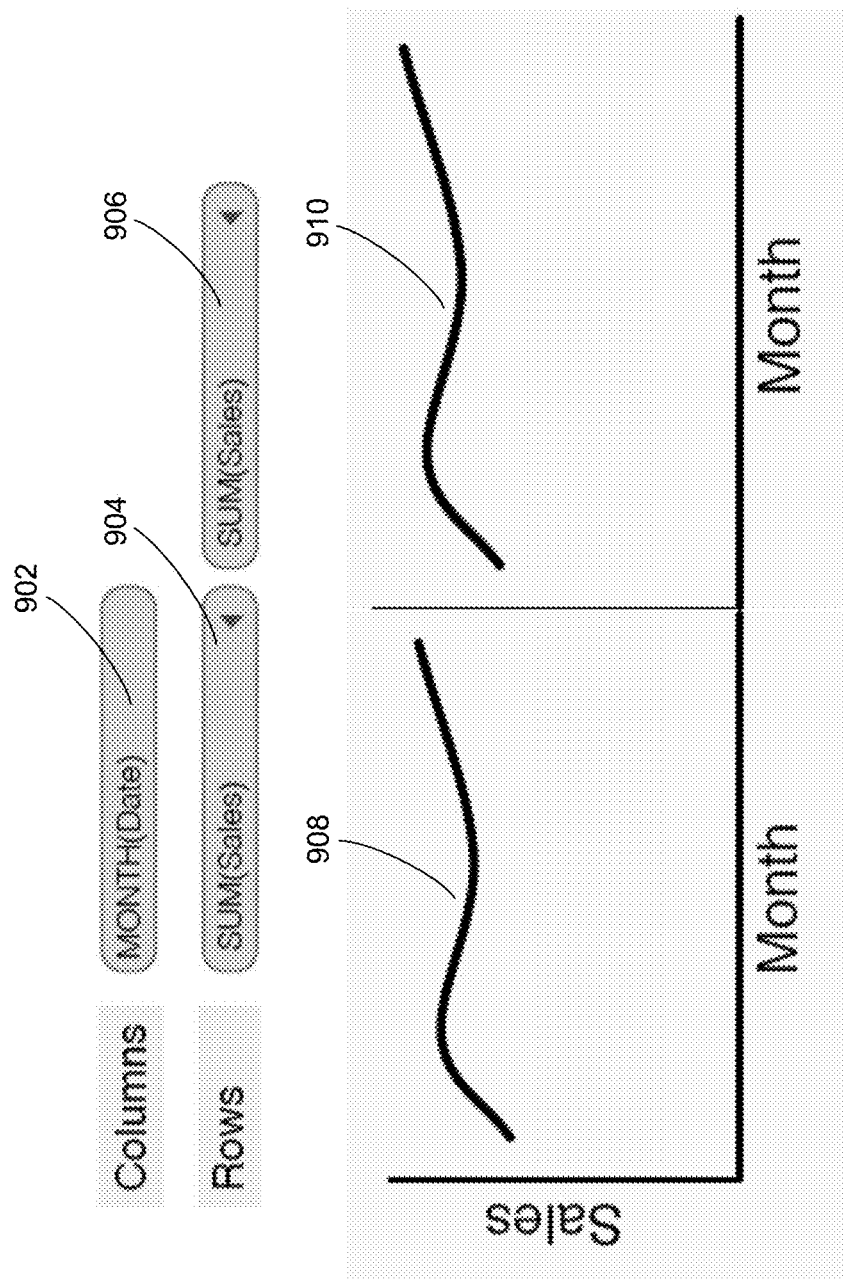
FIGS. 9A-9E illustrate using a data visualization user interface to construct a data visualization that includes two different aggregations of the same data in a single graphic.

FIG. 9A shows the default behavior in some implementations when a user places the same SUM(Sales) pill 904 and 906 onto the rows shelf 232 two times. The columns shelf 230 has a pill 902 for MONTH(Date), so there are two graphs created that show sales as a function of date. The first graph 908 and the second graph 910 are identical.

Figure 9B:
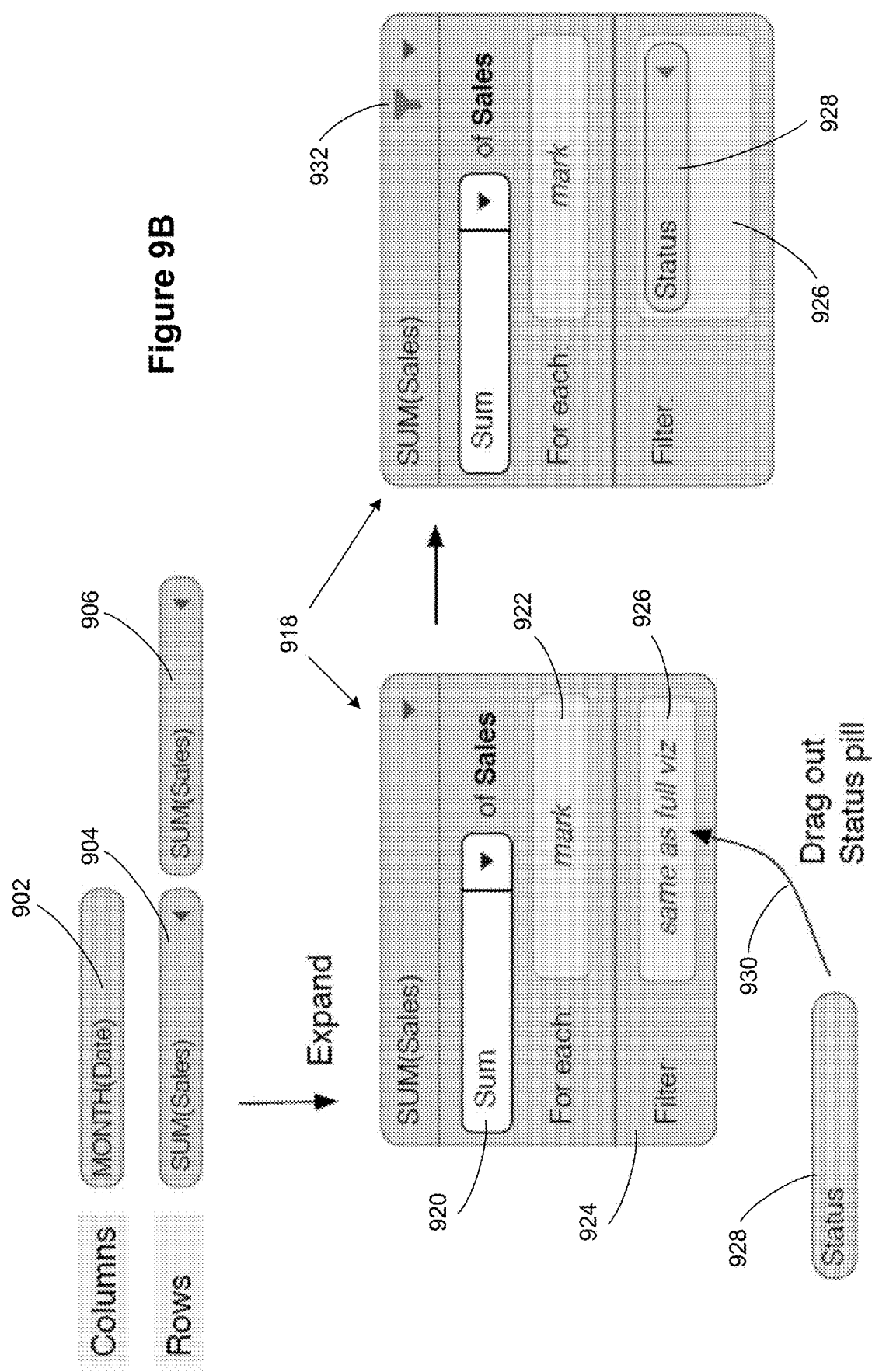

In FIG. 9B, a user expands the first pill 904 to open an expression window 918. The Expression window 918 indicates that it computes the SUM 920 of Sales for each mark 922. In some implementations, the expression window 918 includes a filter section 924. Typically, the default filtering is to use the same filtering as the full data visualization, as shown in the filter region 926. However, a user can alter the filtering that applies to this data element. In some implementations, the user can change the filtering for this data element by dragging (930) a field to the filter region 926. FIG. 9B shows that the user drags the Status pill 928 to the filter region. When this occurs, some implementations include a custom filter icon 932 in the expression window to let the user know that this data element will be computed based on custom filtering.

Figure 9C:
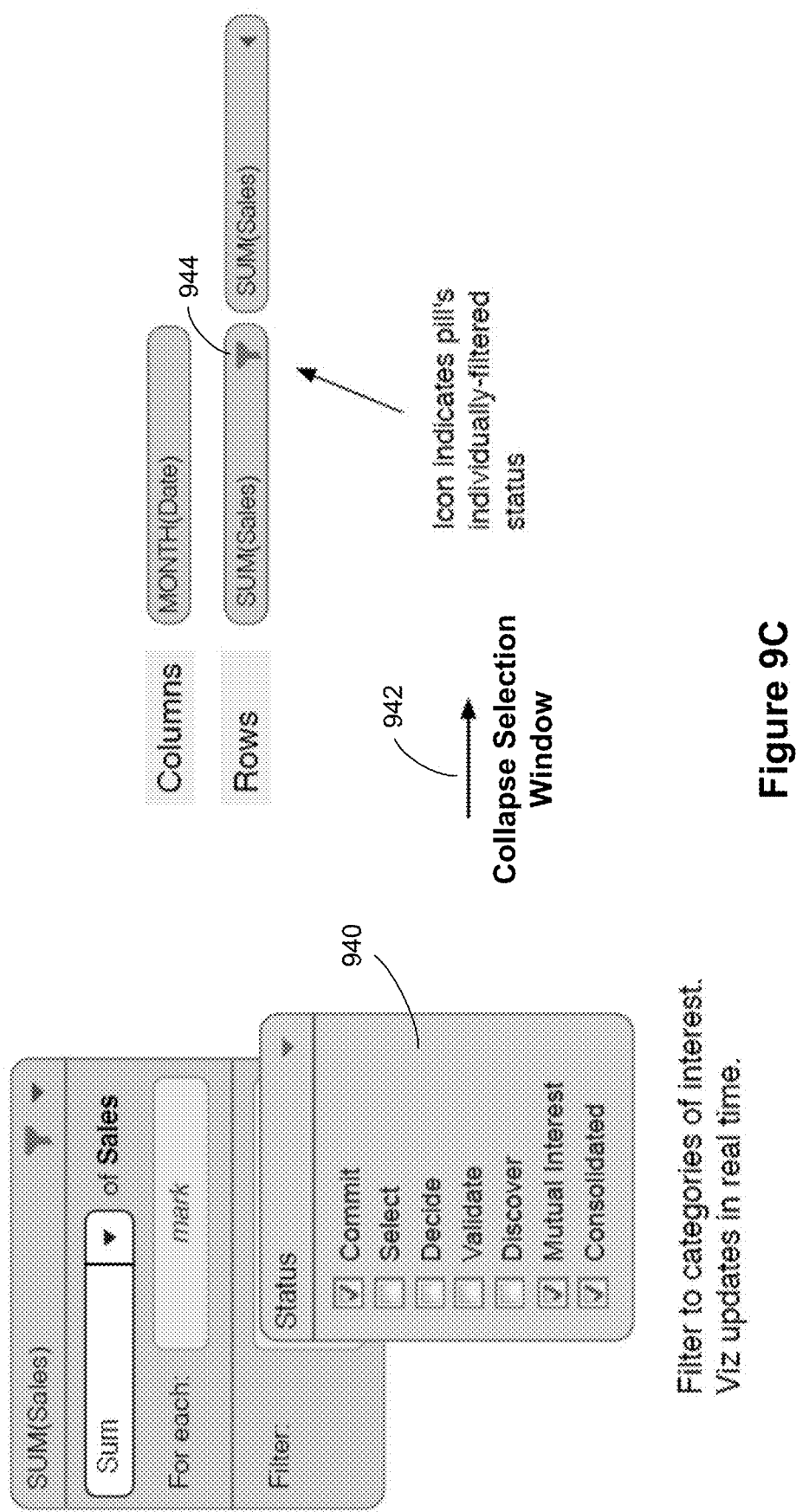

As shown in FIG. 9C, some implementations allow a user to select among a set of values for the fields used for filtering. In this example, the user opens the selection window 940 (e.g., by double clicking the status pill 928 in the filter region 926). In this case, "Status" is a dimension data field with a small number of distinct values, so each of the distinct values is displayed with an adjacent check box to indicate whether the specified status value should be included. Here, the user has selected to include only records whose status values are "Commit," "Mutual Interest," or "Consolidated." In some implementations, the data in the displayed data visualization (see FIGS. 9D and 9E) is updated in real-time as the user changes the filter selection. When the user collapses (942) the selection window 940 and the expression window 918, a custom filter icon 944 displays in the edited pill to indicate that it is being filtered differently. In some implementations, the custom filter icon 944 displayed in the pill 904 is the same as the custom filter icon 932 shown in the expression window 918.

Figure 9D:
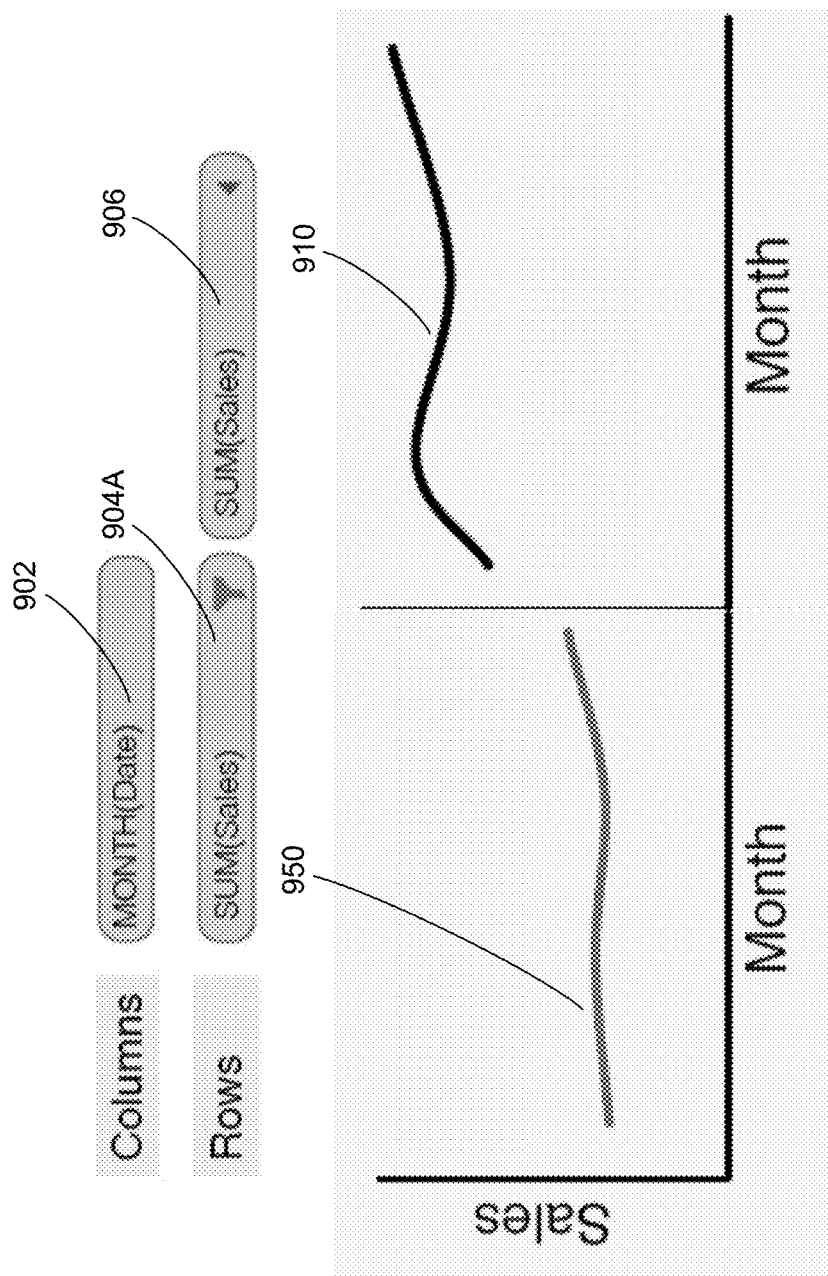

FIG. 9D shows the results of the filtering change. The new expression pill 904A creates a new graph 950 that is different from the original graph 908 because the data is now filtered to specific status values. Showing the new graphic 950 adjacent to the graphic 910 is useful, but the differences between the two graphs are not clearly correlated.

Figure 9E:
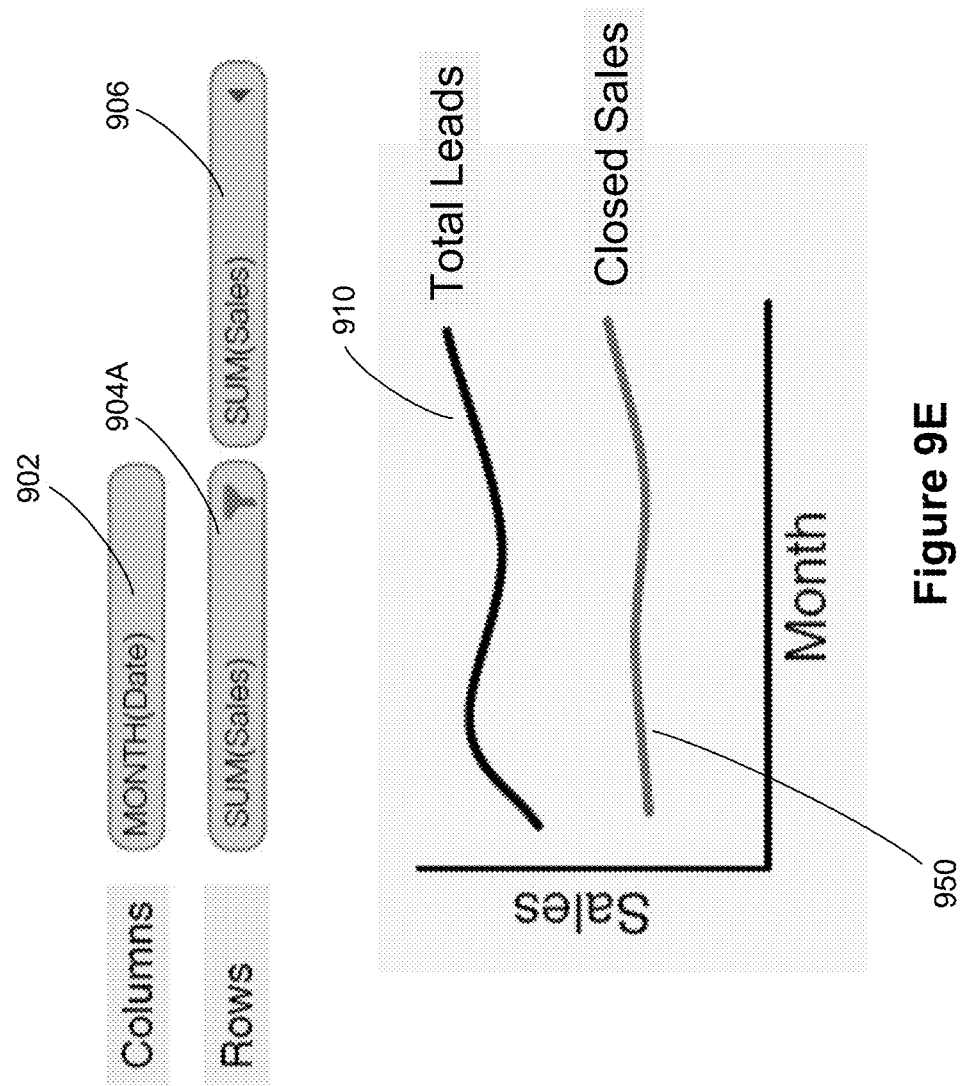

In FIG. 9E, the user has selected an option to superimpose the two graphs on top of each other. In this way, it is easier to see for each month the total sales leads (top line) and the closed sales (bottom line). The user has also added labels to the lines.

Figure 10A:
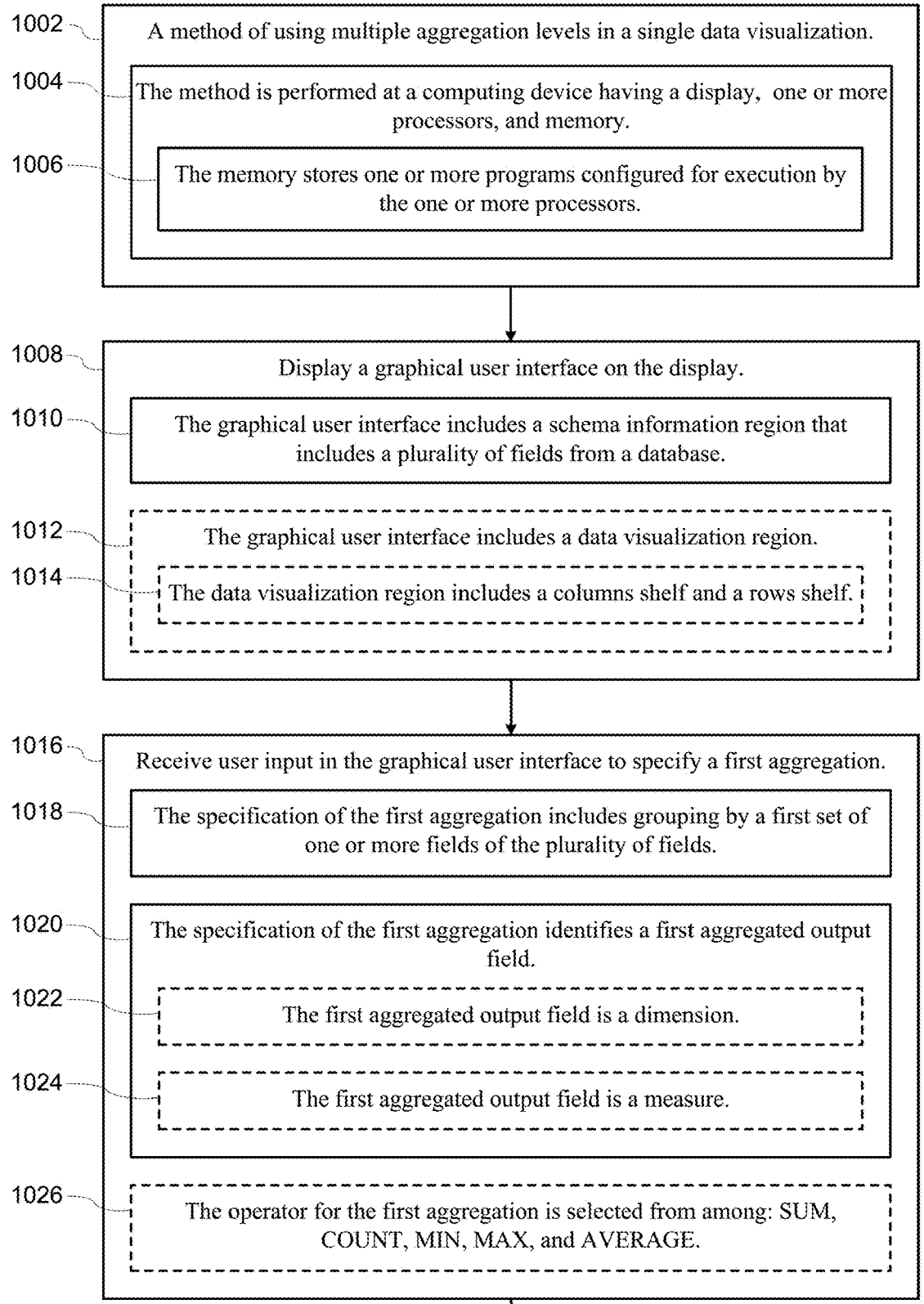
FIGS. 10A-10C provide a flowchart of a process for using a user interface to build data visualizations with multiple levels of detail according to some implementations.
Figure 10B:
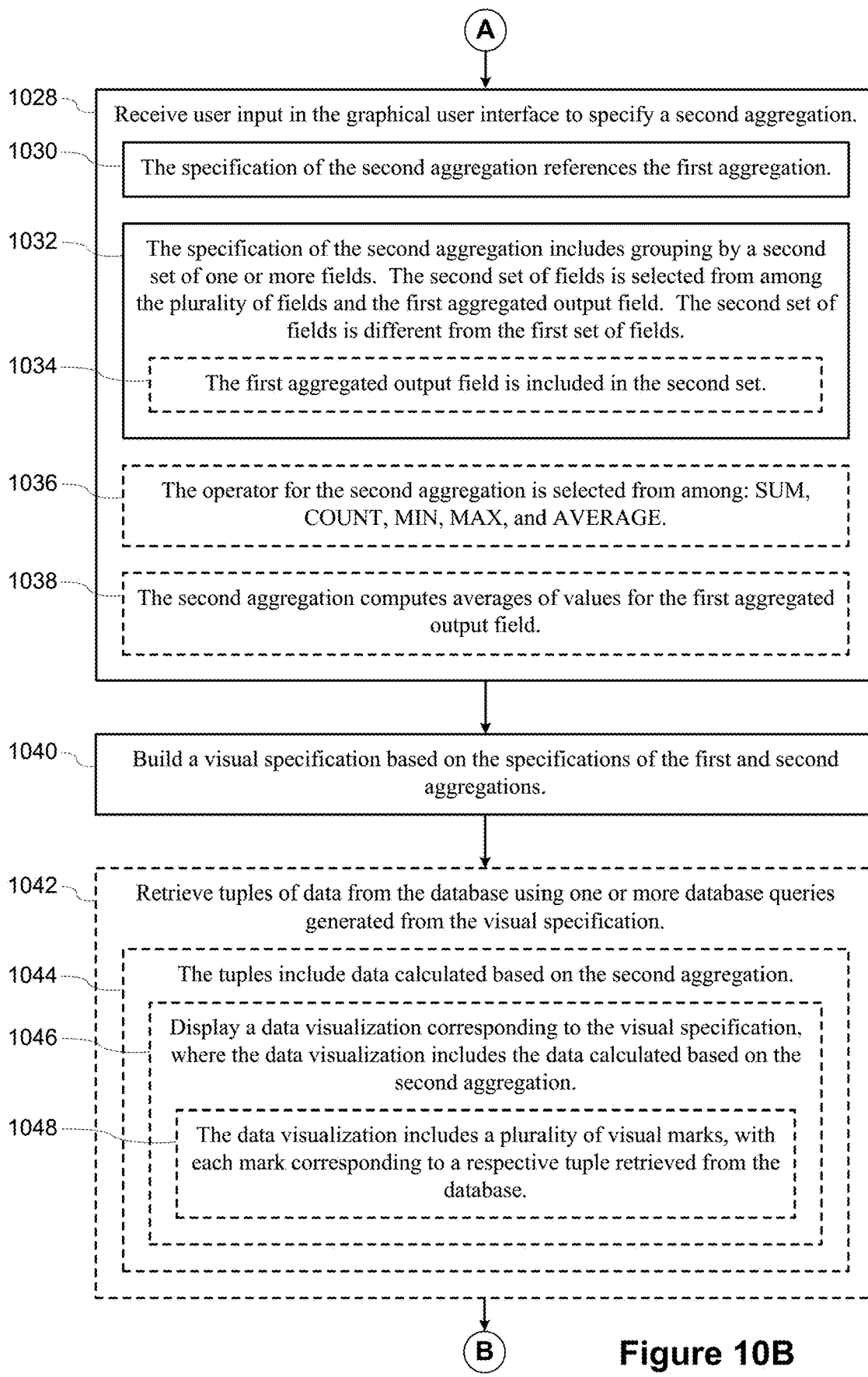
Figure 10C:
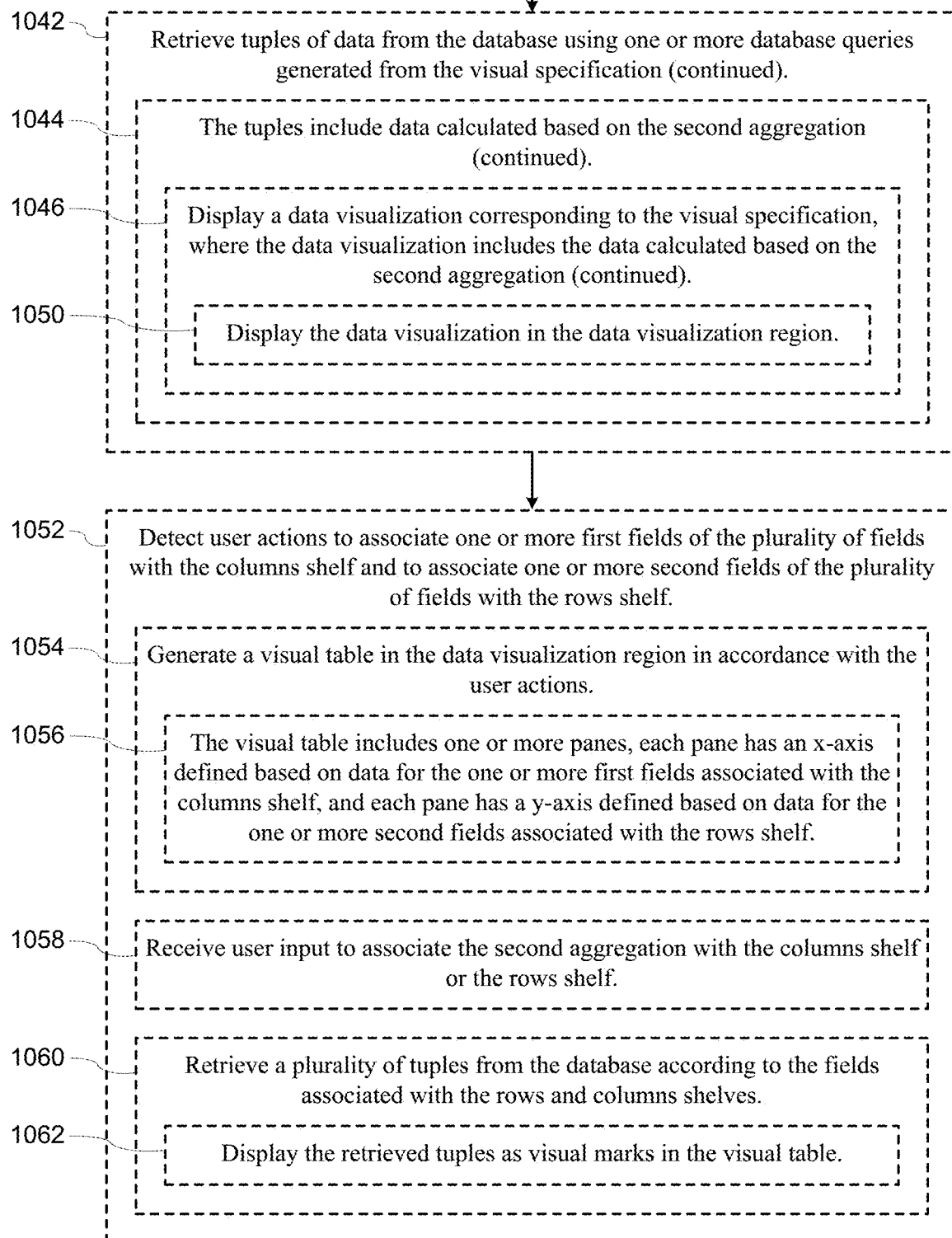

FIGS. 10A-10C provide a flowchart of a process 1000 for using (1002) a user interface to build data visualizations with multiple levels of detail according to some implementations. The method is performed (1004) at a computing device 200 having a display, one or more processors, and memory. The memory stores (1006) one or more programs configured for execution by the one or more processors.

The process displays (1008) a graphical user interface (e.g., the graphical user interface 102 illustrated in FIG. 4) on the display. The graphical user interface includes (1010) a schema information region 410 that includes a plurality of fields from a database. As noted above in FIGS. 2 and 3, databases can be stored in a wide variety of formats. In some implementations, the graphical user interface includes (1012) a data visualization region 412. In some implementations, the data visualization region includes (1014) a columns shelf 230 and a rows shelf 232. Many of these features of a graphical user interface are described above in FIG. 4 with respect to an illustrated user interface 102.

The process 1000 receives (1016) user input in the graphical user interface to specify a first aggregation. In some implementations, a user specifies the first aggregation using an aggregation definition window 224, as described above with respect to FIGS. 5B-5F. The specification of the first aggregation includes (1018) grouping by a first set of one or more fields. Each field corresponds to a field from the database or corresponds to a calculation based on one or more fields from the database.

The specification of the first aggregation identifies (1020) a first aggregated output field. For example, FIGS. 5B-5G build a first aggregation that computes total sales for each customer for each year. In this example, the first aggregated output field is the sales per customer/year. In this example, the first aggregated output field is used (1024) as a measure. FIG. 6G illustrates building a first aggregation whose first aggregated output field is the earliest purchase date for each customer. In this example, the first aggregated output field is used (1022) as a dimension. In some implementations, the application 222 or 322 assigns a default role (dimension or measure) based on the data type, but allows usage as either a dimension or measure when appropriate. In some implementations, the user explicitly overrides the default role, but in other implementations, the role is determined implicitly by usage.

Typically, the operator for the first aggregation is (1026) one of: SUM, COUNT, MIN, MAX, or AVERAGE. In some implementations, the keywords CNT and AVG are used instead of COUNT and AVERAGE. Some implementations provide additional aggregation operators. For example, some implementations provide an ATTR( ) aggregate operator. For each group, the ATTR( ) operator determines if all of the values in the group are the same. If so, the ATTR( ) operator returns that unique value for the group; otherwise, the ATTR( ) operator returns "*", indicating that there are multiple values for the group. Some implementations include the aggregation operators SUM, COUNT, COUNTD, MIN, MAX, AVG, MEDIAN, ATTR, PERCENTILE, STDEV, STDEVP, VAR, and VARP.

The process 1000 also receives (1028) user input in the graphical user interface to specify a second aggregation. Like the first aggregation, the second aggregation may be specified using an aggregation definition window 224. In some implementations, the first and/or second aggregations are specified using a string of text, such as the expression in FIG. 8C, which specifies both a first and a second aggregation.

The second aggregation references (1030) the first aggregation. That is the second aggregation uses the first aggregation in some way. For example, in FIGS. 5A-5G, the second aggregation performs a second aggregation on the data calculated by the first aggregation. In FIGS. 6A-6I, the output of the first aggregation (each customer's earliest purchase date) is used to define the grouping for the second aggregation. Similarly, in FIGS. 7A and 7B, the first calculation computes the year of each customer's first purchase, then uses that computed year in the grouping for the second aggregation. In FIGS. 8B-8D, the first aggregation computes a first set of averages, and the second aggregation uses the output of the first aggregation in an expression that is aggregated in the second aggregation. Each of these is an example of how the second aggregation references the first aggregation.

The specification of the second aggregation includes (1032) grouping by a second set of one or more fields. The second set of fields is selected (1032) from among the plurality of fields and the first aggregated output field. The second set of fields is (1032) different from the first set of fields. In some instances, the first aggregated output field is (1034) included in the second set. For example, in FIGS. 7A and 7B, the first aggregated output field is the year of each customers first purchase, and the second aggregation (which computes the sum of sales) groups customers together based on that computed year (the first aggregated output field).

In some implementations, the operator for the second aggregation is (1036) one of: SUM, CNT, MIN, MAX, or AVG. Some implementations provide additional aggregation operators, so the operator for the second aggregation is one of: SUM, COUNT, COUNTD, MIN, MAX, AVG, MEDIAN, ATTR, PERCENTILE, STDEV, STDEVP, VAR, or VARP. In some instances, the second aggregation computes (1038) averages of values for the first aggregated output field. For example, in FIGS. 5A-5G, the first aggregation computes a sum of sales for each customer/year, and the second aggregation computes averages of those values. In some instances, the second aggregation uses an alternative one of the aggregation operators.

The process 1000 builds (1040) a visual specification based on the specifications of the first and second aggregations. Of course, the visual specification typically includes other information as well. For example, in FIG. 5G, the visual specification may store the user's selection of "Region" for the columns shelf 230. In FIG. 6A, the visual specification may store the color encoding 610 by Customer ID 608.

In some implementations, the process 1000 retrieves (1042) tuples of data from the database using one or more database queries generated from the visual specification, as illustrated in FIG. 1. In some instances, the tuples include (1044) data calculated based on the second aggregation. For example, FIG. 5G illustrates a data visualization 550 based on tuples (region, average sales), and the second element of each tuple is computed by the second aggregation. FIG. 5G also illustrates displaying (1046) a data visualization corresponding to the visual specification, where the data visualization includes the data calculated based on the second aggregation. Each bar in the bar chart shows the average sales per customer per year in a region. For example, the data visualization 550 in FIG. 5G includes (1048) a plurality of visual marks (four bars), with each mark corresponding to a respective tuple retrieved from the database. Note that calculations, including aggregations, may be performed locally (e.g., at the computing device 200), or remotely (e.g., at a server hosting an SQL database). In some instances, some operations are performed remotely and other operations are performed locally. As used herein, the resulting tuples are considered "retrieved from the database" as long as some of the data for building/computing the tuples comes from the database.

In some implementations, the data visualization is displayed (1050) in a data visualization region 412 of a graphical user interface.

In some implementations, the process 1000 detects (1052) user actions to associate one or more fields of the plurality of fields with the columns shelf and to associate one or more second fields of the plurality of fields with the rows shelf. This is illustrated above in FIGS. 5A-5G, 6A-6I, 7A, 8D, and 9A-9E. In some implementations, the process 1000 generates (1054) a visual table in the data visualization region 412 in accordance with the user actions. The visual table includes (1056) one or more panes, each pane has an x-axis defined based on data for the one or more first fields associated with the columns shelf, and each pane has a y-axis defined based on data for the one or more second fields associated with the rows shelf. In some instances, there is a single pane, as illustrated in FIGS. 5G and 6I. However, in other instances, there are multiple panes, as illustrated in FIGS. 9A and 9D.

In some implementations, the process 1000 receives (1058) user input to associate the second aggregation with the columns shelf or the rows shelf. This is illustrated in FIG. 5G (the pill 504A on the rows shelf 232), FIG. 6I (the pill 606 on the rows shelf 232), FIG. 7A (the pill 704 on the rows shelf, and FIG. 8D (the calculation pill 852 on the rows shelf 232).

In some implementations, the process 1000 retrieves (1060) a plurality of tuples from the database according to the fields associated with the rows and columns shelves, as illustrated above. In some instances, the process displays (1062) the retrieved tuples as visual marks in the visual table. This is illustrated above in FIGS. 5G, 6I, 7A, and 8D.

FIGS. 11A-11H illustrate some aspects of using multiple levels of detail according to some implementations. To simplify this discussion, these figures refer to LOD expressions in a text-based format, regardless of whether the expressions are created using graphical user interface controls or entered as text.

The results for a calculation such as SUM([Sales]) depend on the context. In some implementations, the context is defined by the filters and level of detail. In some implementations, dimension fields on rows, columns, color, size, label, detail, or path shelves define the level of detail for the sheet.

For example if the [State] dimension field is on the row shelf, SUM([Sales]) will compute the sum of all transactions for each [State]. If the [Product Type] is also on one of the shelves, SUM([Sales]) will compute the sum of all transactions within each [State] for each [Product Type]. The more dimensions in the sheet or the more unique members each dimension contains, the more granular the results will be. Because each result is drawn as a mark in the visualization, the finer the level of detail for the sheet, the more marks there will be.

Figures 11A, 11B:
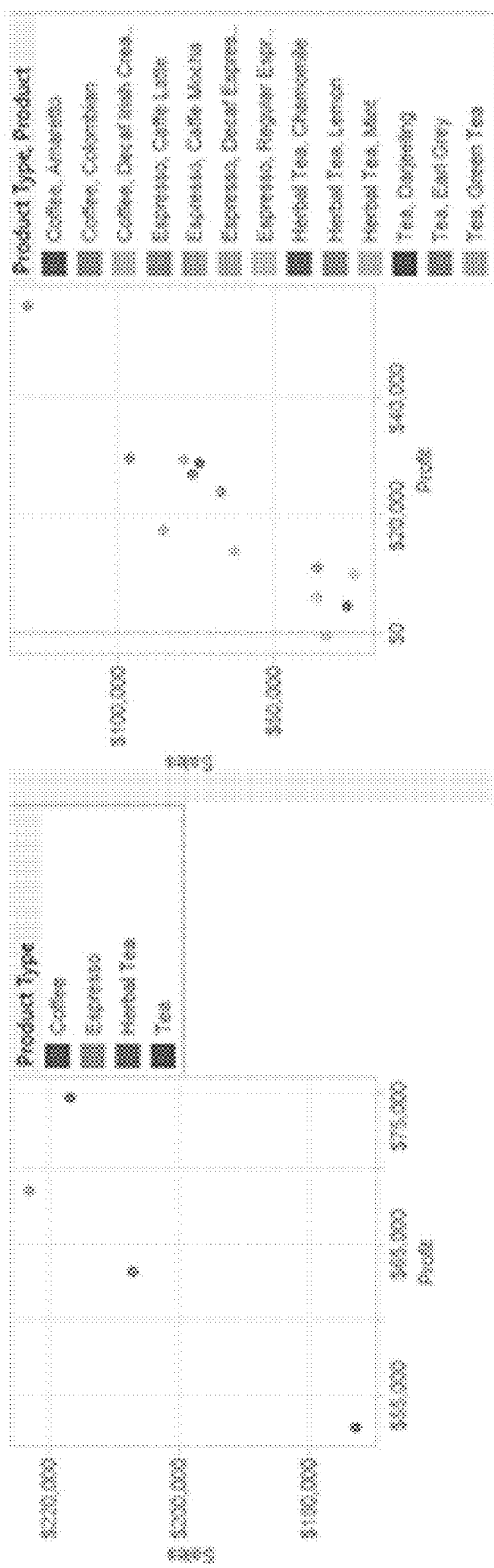
FIGS. 11A-11I illustrate some aspects of using multiple levels of detail according to some implementations.

FIG. 11A is an example using a Coffee Chain dataset. The image on the left has Product Type as the only dimension in the sheet. The one on the right uses Product Type and Product, giving it finer granularity, and thus more marks.

Filters, on the other hand, change the context by reducing the number of data points used in the calculation. For example, a filter may remove a state based on name, based on profit being below zero, or based on not being in the top 5. In some implementations, a data visualization can use a table calculation as a filter, but this is an exception. When using a table calculation as a filter, it just hides marks without changing the data over which the calculations operate.

Level of detail expressions allow a user to individually specify the context for a calculation. For example the LOD expression {fixed [State]:SUM([Sales])} will always calculate the sum of sales per state regardless of sheet's level of detail. It also ignores the filters in effect, with some exceptions described below with respect to FIG. 11E.

Level of detail expressions provide many useful features, including: the ability to use the results mixed with row level values; move the calculation of the mixed and multi-level aggregate calculations to the database server (which can be more efficient than local calculations); use results as dimensions; use results for table calculation addressing or partitioning; or for binning (e.g., grouping together data based on an aggregated calculation, as illustrated in FIGS. 5A-5G, 7A, and 7B).

In some implementations, a level of detail expression has the following structure {keyword [dimension1],[dimension2] . . . :aggregate expression}, as illustrated in FIG. 11B. The dimensionality expression 1112 consists of 0 or more dimensions, which are typically fields from one of the data sources. In some implementations, one or more of the dimensions in the dimensionality expression 1112 can be an expression, such as LEFT([Name], 3). When there are two or more dimensions in the dimensionality expression 1112, they are separated with commas. The aggregate expression 1114 can be a simple aggregate expression, such as SUM (Sales) or MIN(Order Date). The aggregate expression 1114 can be more complex, as illustrated above by the aggregate expression 830 in FIG. 8C. An aggregate expression 1114 must include an aggregation, but it can include other calculations, or even include an IF block (e.g., perform one aggregate calculation in one case, and a different aggregate calculation otherwise). See, for example, FIG. 12B below.

In some implementations, an LOD expression can include a keyword 1110, which specifies how the dimensionality expression 1112 is used, and how the LOD expression interacts with filters. When the keyword is "fixed," the aggregate expression groups data using only the dimension fields listed in the dimensionality expression 1112. When the keyword is "include," the aggregate expression combines the dimensions listed in the dimensionality expression 1112 with dimensions in the sheet. This can be useful for calculating at a fine level of detail in the database then re-aggregating to show data at a coarser level of detail in the visualization. This can also be useful when a calculation's level of detail needs to change when drilling down or more dimensions are added to the sheet. When the keyword is "exclude," the aggregate expression removes the dimensions listed in the dimensionality expression from dimensions in the sheet. This is useful for computing a 'percent of total' or a 'difference from overall average.' This can also be used to compute totals and create reference lines.

When the keyword 1110 is "fixed" and no dimensions are included in the dimensionality expression 1112, the aggregation computes a single result for the entire source table. For example, {fixed:MIN([Order Date])} specifies computing an aggregate minimum for all records in the table. In some instances when the keyword is "fixed" and no dimensions are specified, the keyword and colon are omitted, creating a shorthand such as {MIN([Order Date])}. This particular example specifies computing the date of the very first sale to the very first customer.

Because the level of detail of the sheet determines the number of marks drawn in the visualization, when a calculation has a different level of detail, something needs to be done to reconcile the difference. Note that the different level of detail can be finer or coarser than the level of detail for the sheet.

Figure 11C:
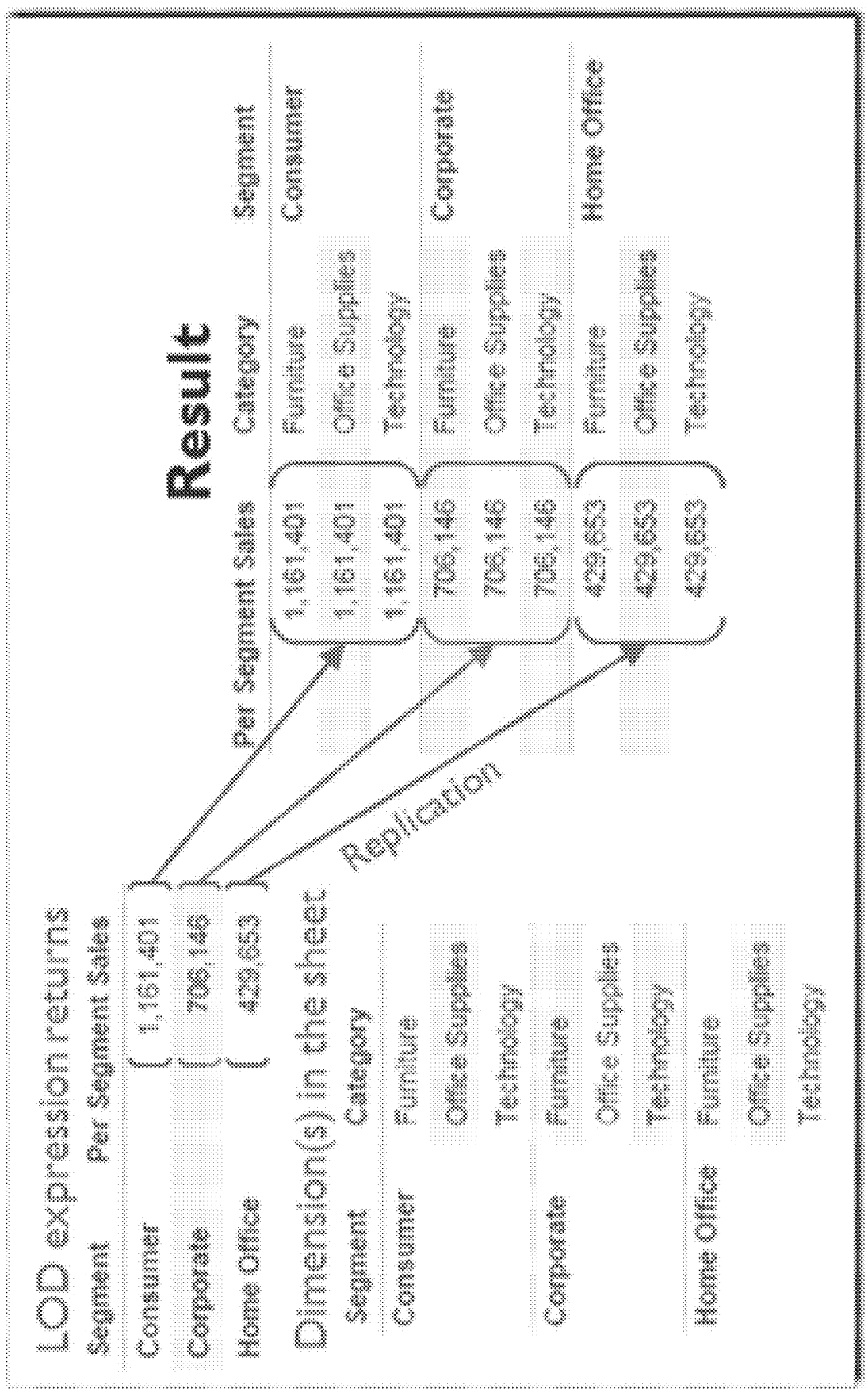

When the calculation has a coarser level of detail, some implementations replicate the results as needed so that there is an appropriate calculated value for each mark. For example, FIG. 11C illustrates computing a sum of sales for each segment, using the LOD expression {fixed [Segment]: SUM([Sales])}. This aggregation is coarser than the data visualization, where the level of detail includes both segment and category. The data for the LOD expression is therefore "replicated" to each tuple based on the segment of the tuple, as illustrated in FIG. 11C.

Because the coarse aggregation is replicated to each corresponding tuple, a user can specify a "row" calculation that uses an aggregated result. For example, consider the case where a user wants to calculate the difference between the dollar amounts of individual transactions and the average dollar amount for that customer. Using an LOD expression, this can be computed as [Transaction Amount]−{fixed [Customer ID]:AVG([Transaction Amount])}.

Figure 11D:
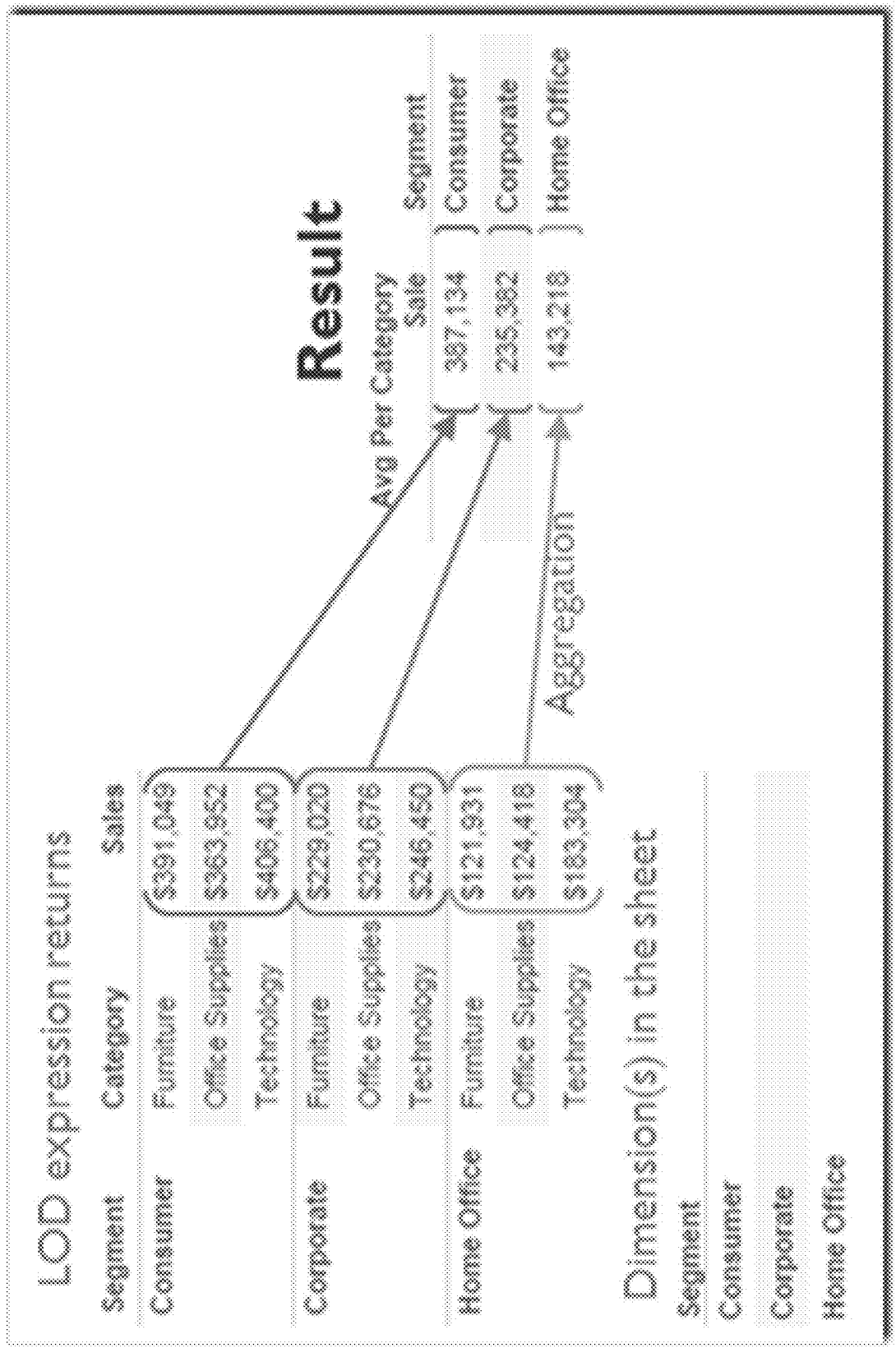

On the other hand, when the aggregate calculation has a finer level of detail than the data visualization, implementations aggregate the results as needed so that there is only one value for each mark. This is illustrated in FIG. 11D, where the LOD expression is {fixed [Segment], [Category]: SUM([Sales])}, whereas the visualization has a level of detail that includes only the segment field. In this example, the user has selected to average the results. This is similar to the example in FIGS. 5A-5G above.

When the "include" keyword is used in an LOD expression, the calculation will always have a level of detail that is either the same as the sheet or finer than the sheet. When it is finer, aggregation is required to match the sheet's level of detail. When the "fixed" keyword is used in an LOD expression, the calculation can have a level of detail that is coarser or finer than the sheet, depending on the calculation and dimensions in the sheet. Because the need to aggregate or not depends on what dimensions are in sheet, this can change anytime based on user selections.

Having an aggregation defined is safe because if and when aggregation is needed, the data visualization application knows what to do. A calculation with a custom level of detail is typically wrapped in an aggregate at the sheet level, as illustrated in FIGS. 5A-5G above. An exception is when the custom calculation is used as a dimension, as illustrated in FIGS. 6A-6I, 7A, and 7B above. When the calculation has the same level of detail as the sheet or is coarser (and thus replicated), changing the aggregation for the calculation does not make any difference in the results.

Some implementations have different default behavior when the "exclude" keyword is selected. For example, in some implementations, when a pill is dragged that has an exclude calculation, the data visualization application defaults to using the ATTR operator rather than SUM or AVG. With "exclude," the calculation for the LOD expression is coarser than (or the same as) the sheet, so the data computed by the LOD expression will be replicated, and thus computing a sum or average would not be useful.

In some implementations, level of detail expressions rely on database queries to calculate the results. In some implementations, the LOD expressions are translated into subqueries with inner joins or cross joins. If the database does not support a CROSS JOIN operator, the data visualization application 222 or data retrieval module 326 creates a join without an ON/WHERE clause, or creates one that always returns true to get the same effect.

Cross-joins are used when there is no common dimension to join on. For example {MIN([Order Date])} is a single value, which is repeated for every row, so there is no need for a join key. It is a cross-join between the main table (that defines the sheet) and a one-row table (resulting from the calculation of the LOD expression).

There are many other cases as well. For example, consider the calculation {exclude [State]:AVG([Sales])} inside a Sheet where [State] is the only dimension. This results in "blank" dimensionality because the LOD expression excludes the one dimension used in the sheet. In this case, a cross-join query is generated.

Figure 11E:
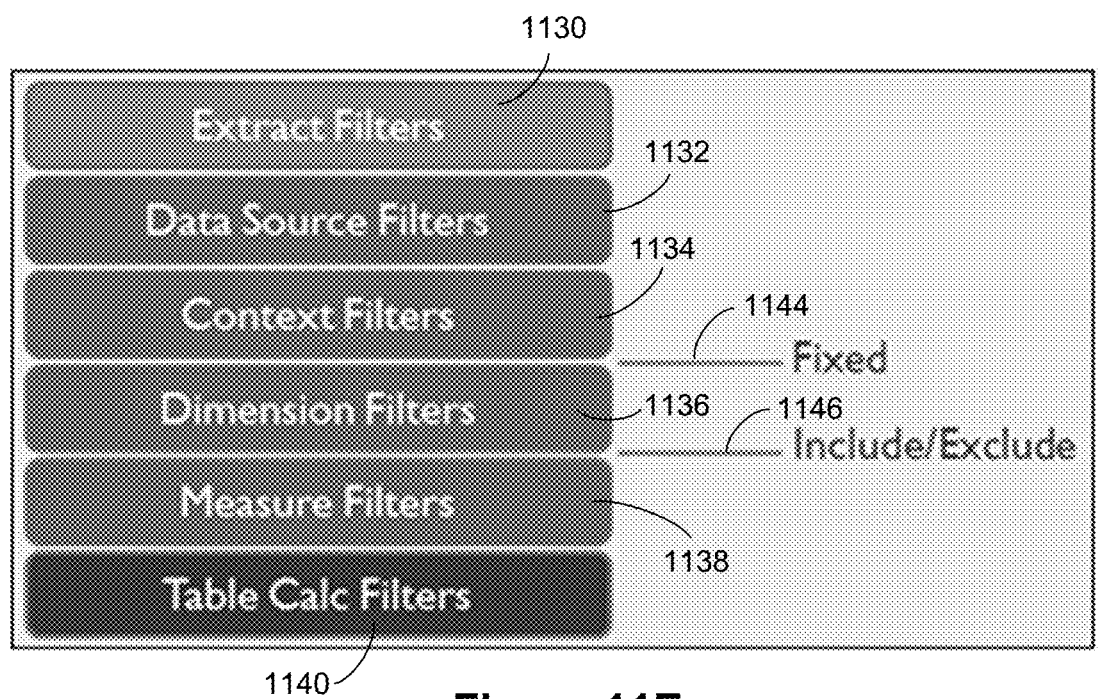

A data visualization can use various types of filters, and these filters affect LOD expressions in different ways. A summary of filter types, and the order in which they are executed (top to bottom) is shown in FIG. 11E.

Extract filters 1130 are only relevant if a user creates an extract from a data source. If so, only data from the extract is available for any calculations. Some implementations also enable data source filters 1132, which have a similar effect as an extract filter, but without creating an extract. Table calculation filters 1140 apply only after the calculations are executed, and these filters hide certain marks without filtering out the underlying data used in calculations.

Although implementations do not require SQL or an SQL database, dimension and measure filters can be understood by analogy with SQL syntax. A dimension filter 1136 corresponds to a WHERE clause, and a measure filter 1138 corresponds to a HAVING clause.

Fixed LOD calculations are executed (1144) before dimension filters. Because of this, a fixed LOD calculation ignores any dimension filters that are applied at the sheet level. This can be very useful. For example, consider the scenario where a user wants to compute each state's total sales as a fraction of the total sales in the United States. The expression SUM([Sales])/ATTR({SUM([Sales])}) does the job, where the portion {SUM([Sales])} is shorthand for {fixed:SUM([Sales])}. Note that in some implementations the ATTR( ) may be omitted. The expression {fixed:SUM ([Sales])} computes the total of all sales, and thus the ratio computes the fraction for each state as desired. Now suppose a user adds a filter to the sheet to hide some of the states. The created dimension filter affects the numerator, but not the denominator. The denominator is fixed, so the total is the sum for all states, regardless of what is displayed in the data visualization. Without this LOD calculation feature, it would be very difficult to create a calculation that behaved "correctly" when a filter was applied.

Some implementations enable a user to designate certain filters as context filters 1134, which gives the user the ability to control whether data is included in fixed LOD calculations.

In some implementations, "include" and "exclude" LOD calculations execute (1146) after dimension filters 1136, just like any other measure calculation. If a user wants filters to apply to an LOD expression, but doesn't want to use a context filter 1134, the LOD calculation can be written to use the "exclude" or "include" keyword 1110.

To understand how LOD expressions interact with computed totals, it is useful to understand the types of totals that data visualization applications provide. Some data visualization applications provide two kinds of totals: Ordinary Totals (aka "Totals" or "single-pass" totals) and Visual Totals (aka "two-pass" totals). Ordinary totals apply the current aggregation type (e.g., SUM, AVERAGE, or MIN) at a coarser level of detail than the sheet. This is typically the default setting when totals are turned on. In some implementations, this option is referred to as "Automatic."

Figure 11F:
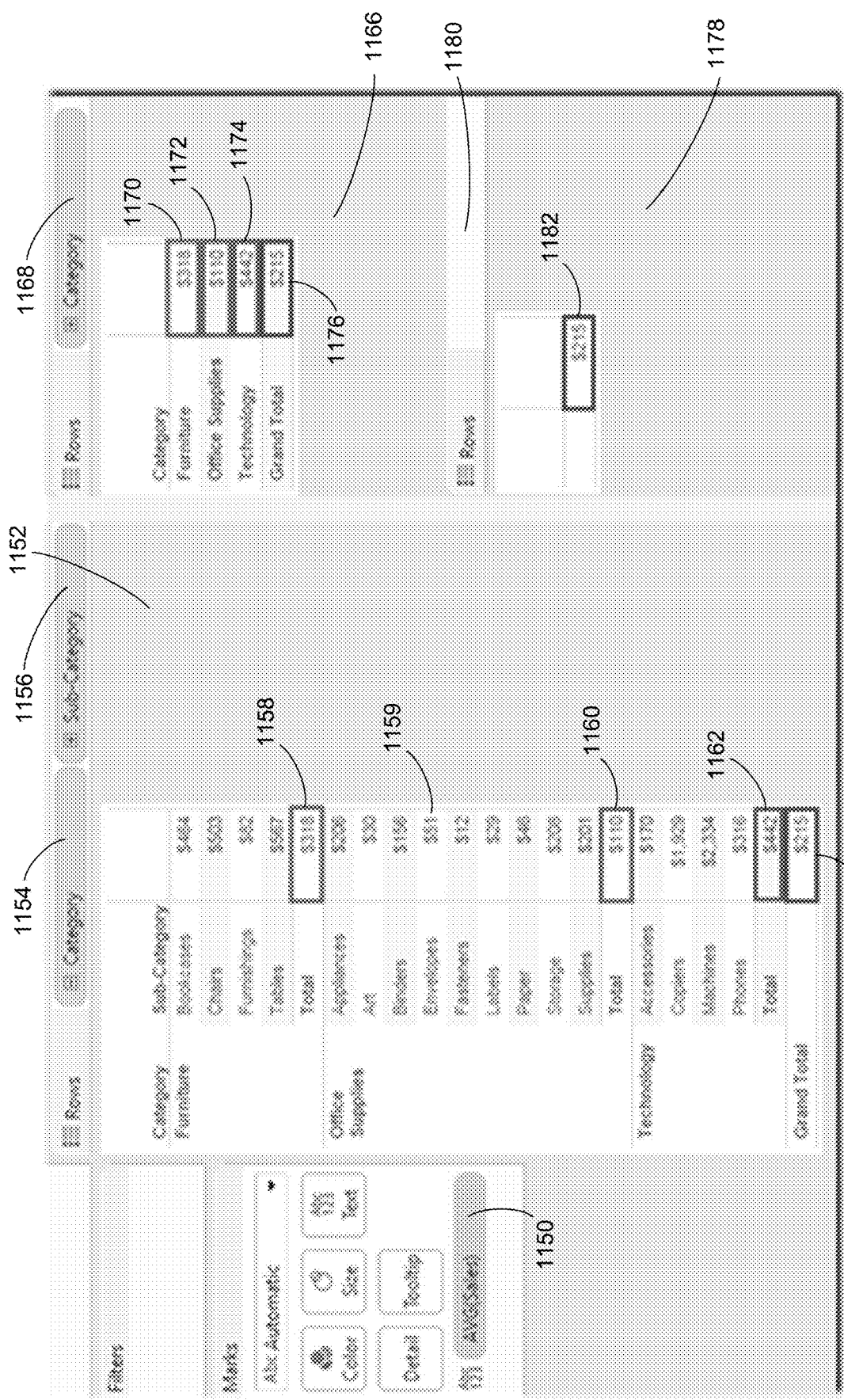

FIG. 11F provides an example of single-pass totals at various levels of detail. As shown on the left, the user has selected to have marks displayed as text showing average sales 1150. Because the aggregation operator AVG is specified, all of the totals are computed as averages of sales.

FIG. 11F actually shows three distinct data visualizations 1152, 1166, and 1178, each based on a different set of dimensions placed on the rows shelf. In the first data visualization 1152, the user has placed the dimension fields Category 1154 and Sub-Category 1156 on the rows shelf, and these form the level of detail for the sheet (and thus for the visualization). With automatic totals, totals (single-pass) are computed. First, subtotals 1158, 1160, and 1162 are computed for each category. Second, a grand total 1164 is computed. Note that the subtotals do not "add up" because they are computed averages. Furthermore, each "subtotal" is not the average of the values above it because an average of an average is not the same as an average of the raw data. Here, each mark, such as the Office Supplies/Envelopes mark 1159, is a computed average of sales transactions for the specified item. Each category subtotal, such as the office supplies subtotal 1160, is an average for individual sales transactions in the office supplies category. Finally, the "grand total" 1164 is the average of all sales transactions.

In the second visualization 1166, the user has placed only the dimension field Category 1168 on the rows shelf, so the level of detail for the second visualization is just category. The visualization computes average sales 1170, 1172, and 1174 for each of the categories, as well as a grand total 1176. As illustrated here, the subtotals in the first data visualization 1152 match AVG(Sales) per Category in the second data visualization 1166, and the first grand total 1164 matches the second grand total 1176.

In the third visualization 1178, the user has not placed any dimension fields on the rows shelf, so the rows shelf is empty (1180). In addition, there are no dimension fields used elsewhere, so the data is aggregated to a single row 1182, which computes AVG(Sales) for the entire table. Note that this matches the grand totals 1164 and 1176 from the first and second visualizations (each one computes AVG(Sales) for the entire set of transactions).

If a user wanted the Total rows to show the average of the rows above them (e.g., computing the average of the values displayed for Bookcases, Chairs, Furnishings, and Tables for the Furniture category), some implementations enable a user to use Visual Totals, which execute in two passes. In some implementations, a user can switch to visual totals by changing the "Total Using" setting from "Automatic" to the desired aggregation type (e.g., SUM or AVERAGE) to be used in the second pass.

Note that values for single pass and two pass will be the same in many common cases. For example, this occurs when computing a SUM of a SUM, a MAX of a MAX, or a MIN or a MIN.

Figure 11G:
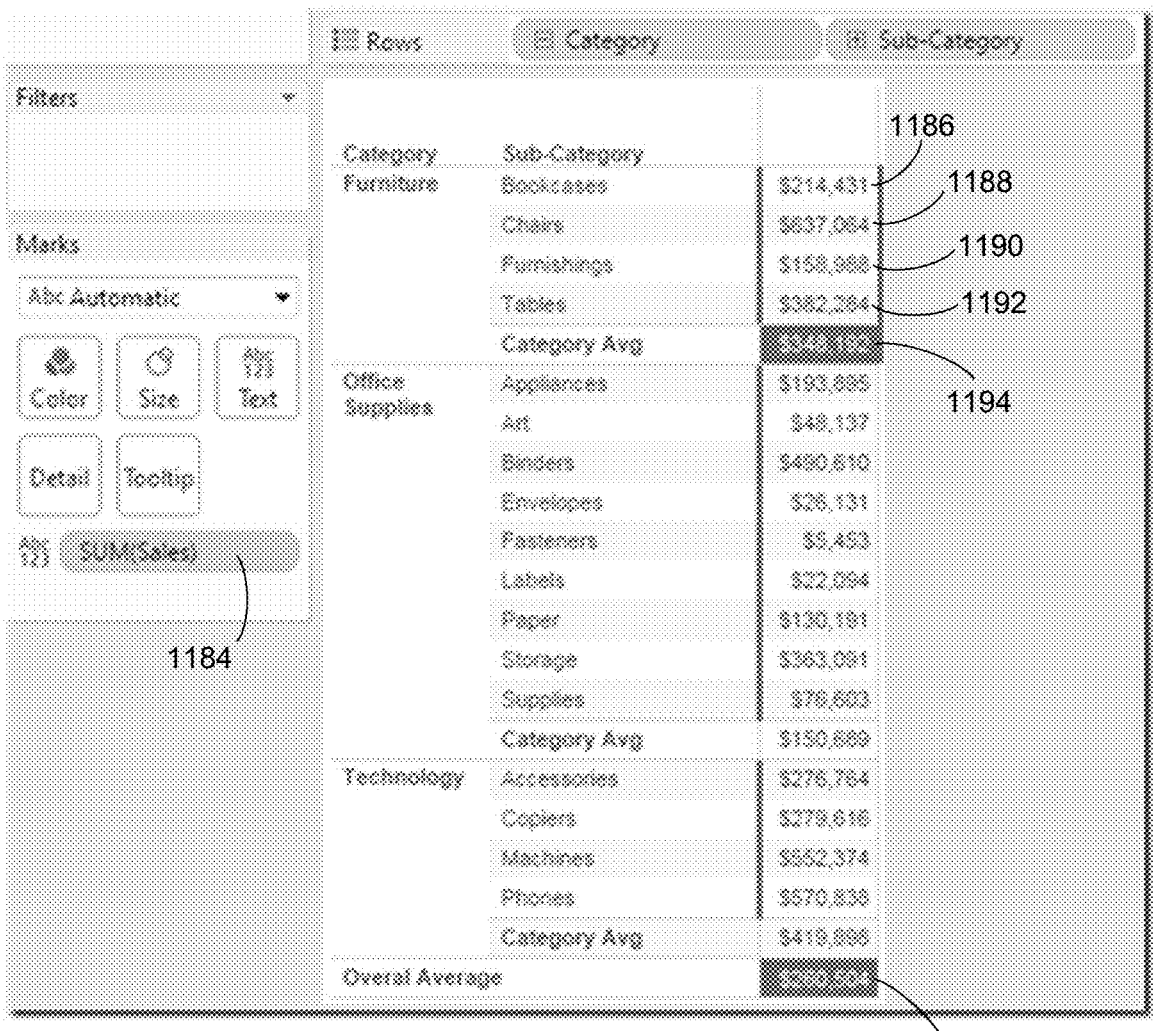

The example in FIG. 11G has the Total Using property set to AVG. The individual marks show a sum of sales as specified by the text property 1184. Therefore, the subtotals show the AVG of SUM of sales per Sub-category within each Category. For example, the furniture subtotal (category average) 1194 is computed as the average of the sales 1186, 1188, 1190, and 1192 for the sub-categories in the furniture category The Grand Total (overall average) 1196 shows the AVG of all the rows.

Now that basic totals have been described, it is useful to describe how totals and level of detail expressions work together in some implementations. Even though a single pass grand total applies the aggregation at table granularity (i.e. as if no dimensions were in the table) this does not affect what happens inside an LOD expression (e.g., inside an expression delineated with curly braces { }).

For example, consider a data visualization that in some way uses the dimension [Product Category]. Suppose the user has created the following calculation, which includes an LOD expression:AVG({include [Customer Name]:SUM ([Sales])}). Assume that this expression is being used as text encoding, similar to the text encoding 1150 in FIG. 11F and the text encoding 1184 in FIG. 11G. The embedded LOD expression {include [Customer Name]:SUM([Sales])} computes aggregate values at the [Customer Name], [Product Category] level, regardless of whether the values are being averaged for a single mark or for the grand total. The row calculation for the grand total only changes how the outer aggregate behaves (the AVG in this case). The results of the inner LOD calculation will be averaged up to [Product Category] for each mark in the Sheet, and will be averaged up to table level (a single value) for the grand total.

Single-pass totals are not affected by the replication that is triggered by LOD expressions that are coarser than the Sheet. However, visual totals (two-pass) are affected.

A fundamental feature of LOD expressions is that there can be an unlimited number of the expressions at various levels of detail and nested in various ways. In particular, several layers of level of detail calculations can be nested to answer even more elaborate business questions. Note that the context for a nested LOD calculation is defined by its parent(s) as opposed to the sheet. For example, the calculation {fixed [State]:AVG({include [Customer]:SUM ([Sales])})} has the same effect as {fixed [State]:AVG ({fixed [State], [Customer]:SUM([Sales])})} because the nested calculation inherits the dimensionality from the outer calculation in the first case. The "include" from the inner LOD expression in the first case brings in the [State] field from the outer LOD expression, creating a dimensionality of [State], [Customer], which is the same as the second case. Also, because the outer calculation is fixed, the nested calculation will not be affected by the filters in the sheet.

Now consider a scenario where an analyst is trying to calculate the average customer spending in each state, and realizes that customers travelling and spending small amounts in multiple states are skewing the results. Instead of filtering out that spending, the analyst decides to calculate the total spending for each customer and use that value in each state average for which the customer spends money. The calculation {fixed [State], [Customer]:AVG({exclude

Figure 11H:
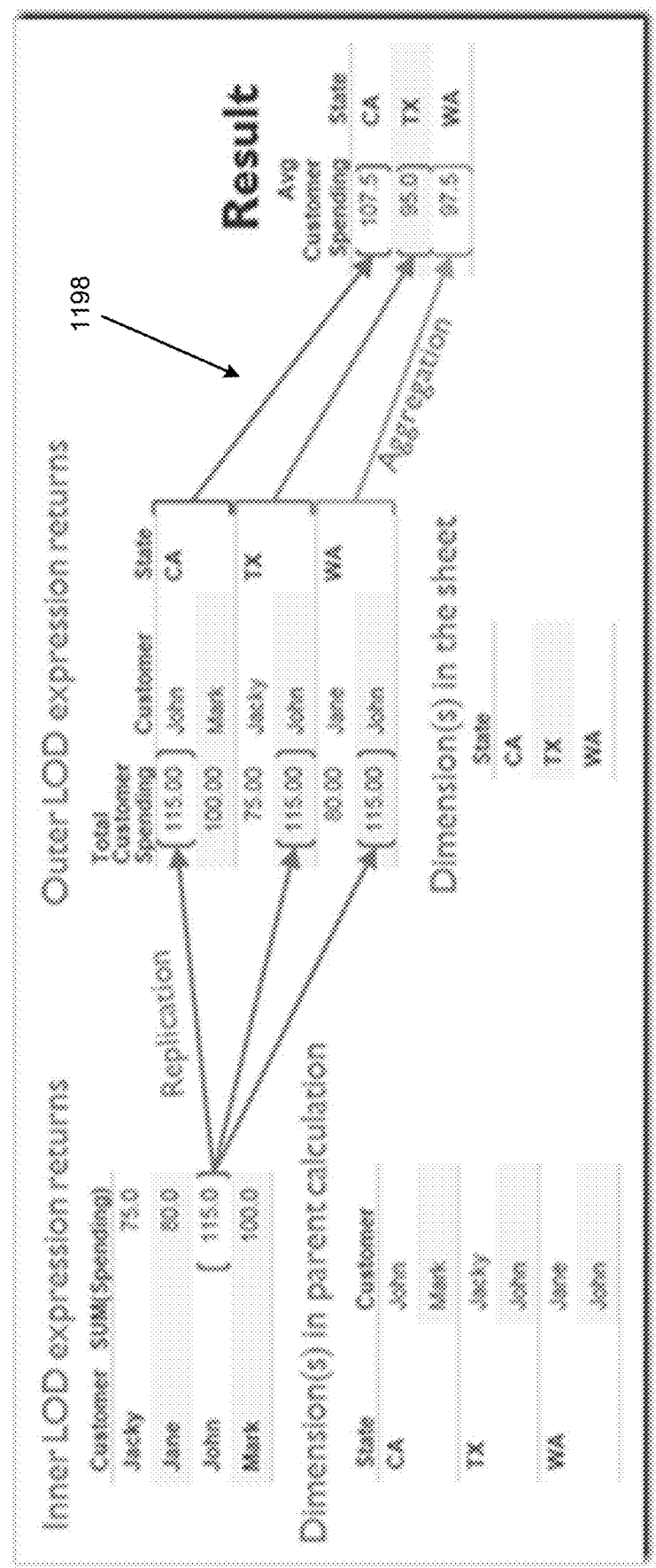

[State]:SUM([Spending])})} is one way to achieve the desired result, as illustrated in FIG. 11H. The inner LOD expression computes the SUM(Spending) for each customer, and the outer LOD expression computes the average spending per customer per state. Here, the outer aggregation operator doesn't really matter because there will be only one record from the inner aggregation for each outer aggregation. For example, SUM, MIN, or MAX for the outer LOD expression would yield the same result.

The entire expression is then included (1198) in an average. At the sheet level, the level of detail is State, so the average spending per customer in each state is computed. In some implementations, a pill containing the expression has its aggregation set to AVG when a user drags it into the sheet.

In the Example of FIG. 11H, customer John has spending in California, Texas, and Washington. His total spending is computed (for all of these states), and that total spending for John is then used in computing the average spending for these three states.

Figure 11I:
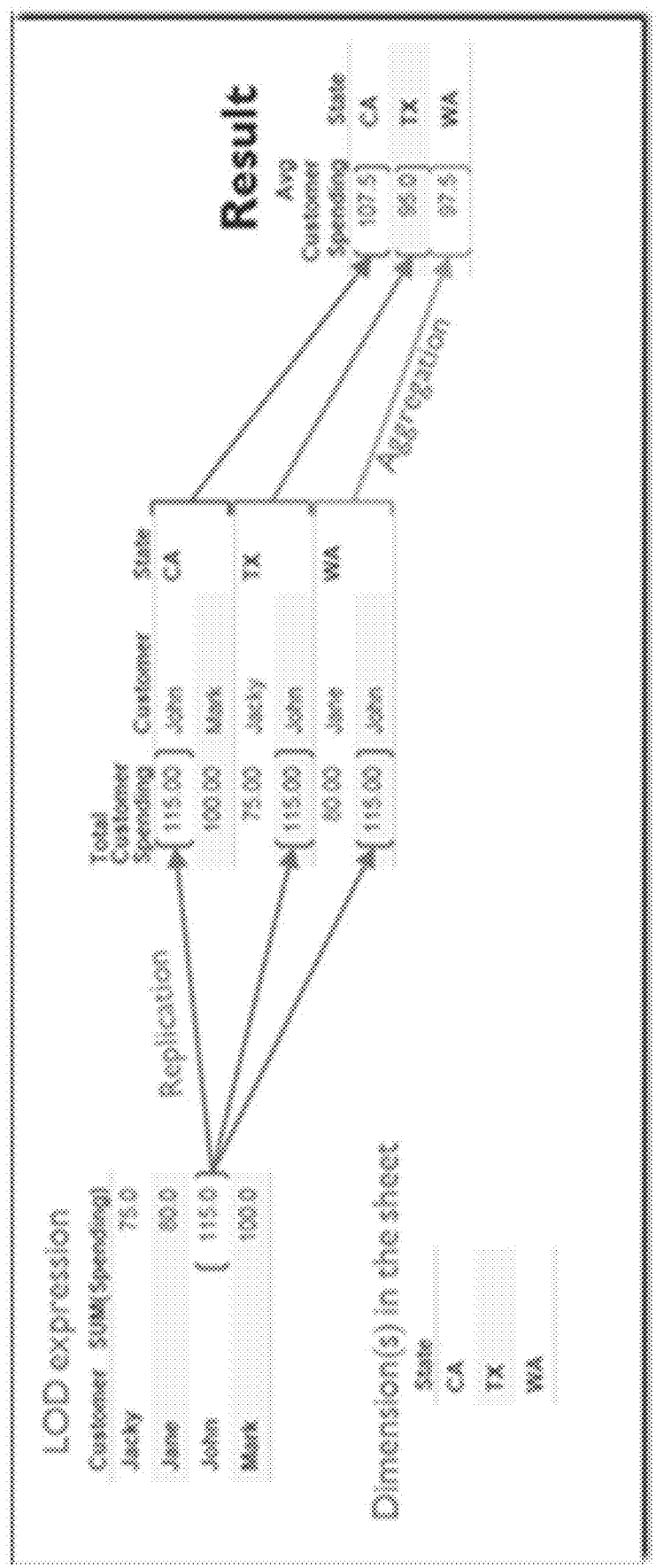

Although this example in relation to FIG. 11H is a good example for explaining how nesting works, there is a simpler way of writing this calculation, as illustrated in FIG. 11I. For example, the LOD expression {fixed [Customer]:SUM ([Spending])} computes the total spending for each customer. Assume the [State] dimension field is used somewhere in the sheet (e.g., on the rows shelf or on the columns shelf). Place a pill with the LOD expression on the sheet (e.g., as text encoding or on the rows or columns shelf), and set the pill's aggregation to AVG. This is similar to the example in FIGS. 8B-8D above. In some implementations, when an INNER JOIN is generated, it does so between the dimensionality of the level of detail (LOD) expression and dimensionality that is the union of the sheet and the LOD expression's dimensionalities. In this case, the union of dimensionalities is Customer (from the calculation)+State (from the Sheet), which will result in the same replication behavior as in the nested case illustrated in FIG. 11H.

In some implementations, LOD expressions are computed using queries executed at the database (e.g., a database server). Because of this, performance depends heavily on the database engine, the size of the data, what indexes exist, and the complexity and level of nesting. If the dataset is large and the database is fast, level of detail expressions can provide vastly improved performance because the finer detail calculations are performed at the database instead of moving a large dataset over the wire onto a local computing device.

When a level of detail expression computes a floating point result, some implementations disallow using the output as a dimension because floating point arithmetic does not give results that are reliable for equality comparisons. This prevents causing unexpected results from JOINs, which check for equality.

One challenge in data analysis is translating a question that is easy to articulate in spoken language into an answer that is expressed as a data visualization. Sometimes the analysis requires comparing or referencing data at multiple different aggregation levels. The primary focus of the visualization may be at one level but the question may reference another level. For example, an analyst is visualizing sales revenue at a country level on a map, but wants to compare those sales to a global sales number.

As described above, the main visualization aggregation level is referred to as its "level of detail" or LOD. The disclosed LOD expressions go beyond the visualization level of detail. For example, the data in the visualization may be filtered, whereas an LOD expression can access data before it is filtered.

Figure 12A:
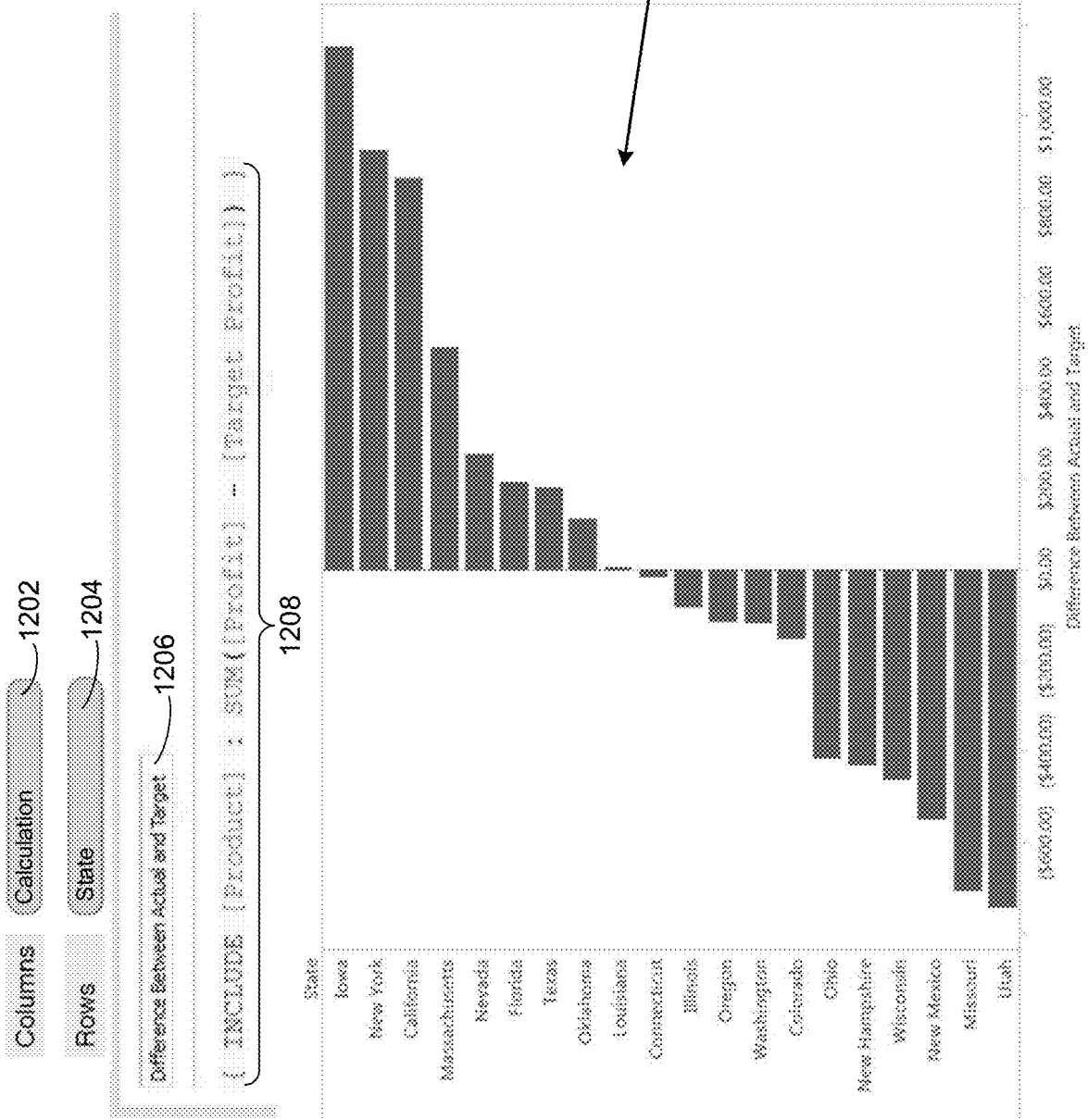
FIGS. 12A-12B provide another example of building a data visualization that uses multiple levels of detail in accordance with some implementations.
Figure 12B:
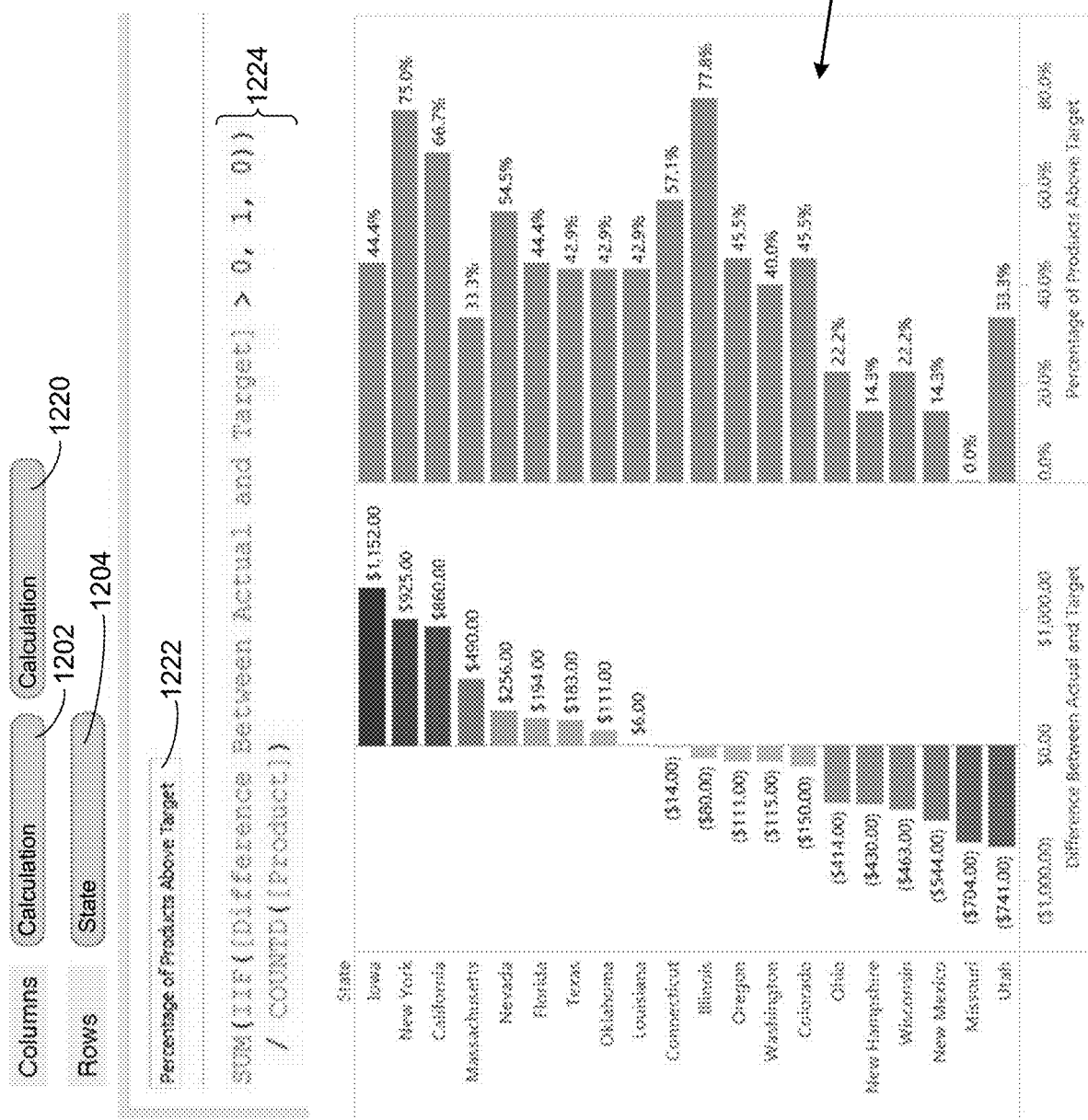

FIGS. 12A and 12B use an LOD expression in comparing actual profits to target profits. But here, rather than just asking about overall profits, an analyst wants to know what percentages of products in each state hit, or miss, their own target. The main focus is to look at each state, but the data for each product must be evaluated within each state.

The goal is to chart the difference in actual profit compared to target profit for a chain of coffee houses, which is shown in FIG. 12A. In the data visualization 1210 it is easy to see which states have exceeded the target and which states missed the target. FIG. 12B adds a second calculation, and the resulting data visualization 1226 shows not only profitability by state, but also what percentage of products in each state met their targets. This shows, for example, that Massachusetts beat the state target, but has a relatively small proportion of products that are meeting their individual targets. This additional information could warrant further investigation.

In FIG. 12A, the user has placed the State field 1204 onto the rows shelf, which creates a separate row in the data visualization 1210 for each state. On the columns shelf is a custom calculation 1202 that uses the LOD expression 1208. Because the LOD expression uses "INCLUDE," the dimensionality for the LOD expression is [State], [Product]. Therefore, the LOD expression computes the sum of [Profit]−[Target Profit] for each State/Product combination. In the illustrated implementation, the user has assigned the name "Difference Between Actual and Target" 1206 to this calculation. At the visualization level, the data is grouped by state using SUM(Calculation) 1202, so the data shown in the data visualization has summed the data by state. If the data visualization 1210 shown in FIG. 12A was all a user was looking for, then the LOD expression was not required.

However, FIG. 12B shows how the data from the LOD expression can be used to provide additional information. As shown, the State field 1204 is still on the rows shelf, and the first calculation 1202 is still on the columns shelf. However, the user has defined another calculation based on the first calculation. The expression 1224 for the second calculation computes the percentage of products in each state that hit the target. The user has assigned the second calculation the name "Percentage of Products Above Target" 1222 and used this calculation in the second calculation 1220 on the columns shelf. Because this is a second measure on the columns shelf, the data for the second calculation appears as a second pane.

The logic of the expression 1224 is fairly simple. Because the SUM and COUNTD aggregate operators in the expression 1224 are not part of an LOD expression, they will aggregate data by State (because it is the only dimension appearing in the data visualization). The numerator computes the number of products whose actual profits exceed the target by combining the SUM with an immediate IF. The denominator uses the operator COUNTD to compute the number of distinct products sold in each state. The data visualization 1226 shows the data for both the first calculation and the second calculation.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a computer in communication with a display, one or more processors, and memory storing one or more programs configured for execution by the one or more processors:
   displaying a graphical user interface, including:
   a data visualization region;
   a shelf region with a plurality of shelves, each shelf of the plurality of shelves defining a respective characteristic of a data visualization based on placement of data fields onto the respective shelf; and
   a schema information region that includes a plurality of data fields from a database, wherein each data field of the plurality of data fields is designated as a dimension data field or a measure data field;
   receiving a first user input via the graphical user interface to place a first dimension data field from the schema information region into the shelf region;
   in accordance with receiving the first user input;
   determining a visualization level of detail that is based on at least the first dimension data field;
   querying the database to retrieve first tuples of data that are calculated according to the visualization level of detail; and
   aggregating the retrieved first tuples of data according to a first aggregation operator:
   receiving a second user input via the graphical user interface to specify an aggregation, the aggregation identifying a subset of data fields from the plurality of data fields and having a custom level of detail distinct from the visualization level of detail;
   in accordance with receiving the second user input:
   determining a second aggregation operator that is different from the first aggregation operator;
   querying the database to retrieve second tuples of data, calculated according to the custom level of detail; and
   aggregating the retrieved second tuples according to the visualization level of detail and the second aggregation operator to form aggregated tuples of data;
   generating a data visualization corresponding to the aggregated tuples of data; and
   displaying the data visualization in the data visualization region.

2. The method of claim 1, wherein the second user input comprises user placement of the subset of data fields from the schema information region into an aggregation definition window of the graphical user interface, distinct from the shelf region.

3. The method of claim 2, wherein:
   the first user input includes dragging the first dimension data field from the schema information region into the shelf region; and
   the second user input includes dragging the subset of data fields from the schema information region into the aggregation definition window.

4. The method of claim 1, wherein the second user input comprises a text input into an aggregation definition window, distinct from the shelf region.

5. The method of claim 4, wherein the text input includes a first keyword selected from the group consisting of: FIXED, INCLUDE, and EXCLUDE.

6. The method of claim 4, wherein the text input includes a dimensionality expression and comprises a list of one or more dimension data fields of the plurality of data fields.

7. The method of claim 1, wherein aggregating the retrieved second tuples according to the visualization level of detail and the second aggregation operator includes identifying a first aggregated output field.

8. The method of claim 7, wherein the first aggregated output field is used as a dimension.

9. The method of claim 7, wherein the first aggregated output field is used as a measure and the custom level of detail computes averages of values for the first aggregated output field.

10. The method of claim 1, wherein:
    the subset of data fields includes a second dimension data field and a first measure data field; and
    the aggregation (i) groups data values of the second dimension data field according to one or more respective distinct data values of the second dimension data field and (ii) executes an aggregation function via the second aggregation operator to aggregate data values of the first measure data field for each of the respective distinct data values of the second dimension data field.

11. The method of claim 1, wherein generating and displaying the data visualization comprises generating and displaying a plurality of visual marks, each mark corresponding to a respective aggregated tuple retrieved from the database.

12. The method of claim 1, wherein:
    the plurality of shelves include a column shelf and a row shelf; and
    generating the data visualization region includes generating a visual table having one or more panes, each of the one or more panes including:
    an x-axis defined based on data for one or more data fields placed into the column shelf; and
    a y-axis defined based on data for one or more data fields placed into the row shelf.

13. The method of claim 12, wherein:
    displaying the data visualization includes displaying the aggregated tuples of data as visual marks in the visual table.

14. The method of claim 1, further comprising:
    generating a visual specification that includes the visualization level of detail and the custom level of detail, the visual specification further specifying one or more aggregations.

15. The method of claim 14, wherein specifying one or more aggregations includes specifying operators for the one or more aggregations.

16. The method of claim 15, wherein the operators are selected from the group consisting of: SUM, COUNT, COUNTD, MIN, MAX, AVG, MEDIAN, ATTR, PERCENTILE, STDEV, STDEVP, VAR, and VARP.

17. A computer system in communication with a display, comprising:
one or more processors;
memory; and
one or more programs stored in the memory for execution by the one or more processors, the one or more programs comprising instructions for:
displaying a graphical user interface, including:
a data visualization region;
a shelf region with a plurality of shelves, each shelf of the plurality of shelves defining a respective characteristic of a data visualization based on placement of data fields onto the respective shelf; and
a schema information region that includes a plurality of data fields from a database, wherein each data field of the plurality of data fields is designated as a dimension data field or a measure data field;
receiving a first user input via the graphical user interface to place a first dimension data field from the schema information region into the shelf region;
in accordance with receiving the first user input:
determining a visualization level of detail that is based on at least the first dimension data field;
querying the database to retrieve first tuples of data that are calculated according to the visualization level of detail; and
aggregating the retrieved first tuples of data according to a first aggregation operator;
receiving a second user input via the graphical user interface to specify an aggregation, the aggregation identifying a subset of data fields from the plurality of data fields and having a custom level of detail distinct from the visualization level of detail;
in accordance with receiving the second user input:
determining a second aggregation operator that is different from the first aggregation operator;
querying the database to retrieve second tuples of data, calculated according to the custom level of detail; and
aggregating the retrieved second tuples according to the visualization level of detail and the second aggregation operator to form aggregated tuples of data;
generating a data visualization corresponding to the aggregated tuples of data; and
displaying the data visualization in the data visualization region.

18. A non-transitory computer readable storage medium storing one or more programs configured for execution by a computer system in communication with a display, one or more processors, and memory, the one or more programs comprising instructions for:
displaying a graphical user interface, including:
a data visualization region;
a shelf region with a plurality of shelves, each shelf of the plurality of shelves defining a respective characteristic of a data visualization based on placement of data fields onto the respective shelf; and
a schema information region that includes a plurality of data fields from a database, wherein each data field of the plurality of data fields is designated as a dimension data field or a measure data field;
receiving a first user input via the graphical user interface to place a first dimension data field from the schema information region into the shelf region;
in accordance with receiving the first user input:
determining a visualization level of detail that is based on at least the first dimension data field;
querying the database to retrieve first tuples of data that are calculated according to the visualization level of detail; and
aggregating the retrieved first tuples of data according to a first aggregation operator:
receiving a second user input via the graphical user interface to specify an aggregation, the aggregation identifying a subset of data fields from the plurality of data fields and having a custom level of detail distinct from the visualization level of detail;
in accordance with receiving the second user input:
determining a second aggregation operator that is different from the first aggregation operator;
querying the database to retrieve second tuples of data, calculated according to the custom level of detail; and
aggregating the retrieved second tuples according to the visualization level of detail and the second aggregation operator to form aggregated tuples of data;
generating a data visualization corresponding to the aggregated tuples of data; and
displaying the data visualization in the data visualization region.

* * * * *